US012632709B1

(12) United States Patent
Wane

(10) Patent No.: US 12,632,709 B1
(45) Date of Patent: May 19, 2026

(54) ENHANCING ARTIFICIAL NEURAL NETWORKS WITH EPHAPTIC COUPLING

(71) Applicant: Ephapsys Inc., San Francisco, CA (US)

(72) Inventor: Ismaila Wane, Mountain View, CA (US)

(73) Assignee: Ephapsys Inc., San Francisco, CA (US)

( * ) Notice: Subject to any disclaimer, the term of this patent is extended or adjusted under 35 U.S.C. 154(b) by 0 days.

(21) Appl. No.: 19/231,306

(22) Filed: Jun. 6, 2025

Related U.S. Application Data

(60) Provisional application No. 63/817,145, filed on Jun. 3, 2025, provisional application No. 63/815,605, filed on May 31, 2025, provisional application No. 63/795,180, filed on Apr. 25, 2025.

(51) Int. Cl.
G06N 3/048 (2023.01)
G06N 3/084 (2023.01)
G06N 3/092 (2023.01)

(52) U.S. Cl.
CPC ............. G06N 3/048 (2023.01); G06N 3/084 (2013.01); G06N 3/092 (2023.01)

(58) Field of Classification Search
CPC ......... G06N 3/048; G06N 3/092; G06N 3/083
See application file for complete search history.

(56) References Cited

U.S. PATENT DOCUMENTS

| | | | | |
|---|---|---|---|---|
| 6,208,963 B1 * | 3/2001 | Martinez | ................. | G06N 3/09 |
| | | | | 704/E15.017 |
| 7,174,325 B1 | 2/2007 | Ascoli | | |
| 9,220,425 B2 | 12/2015 | Shachar | | |

(Continued)

OTHER PUBLICATIONS

Usama, M. et al., "Deep feature learning for disease risk assessment based on convolutional neural network with intra-layer recurrent connection by using hospital big data," IEEE Access Special Section on Big Data Learning and Discovery (Dec. 3, 2018) pp. 67927-67939. (Year: 2018).*

Yan, Y. et al., "Backpropagation with sparsity regularization for spiking neural network learning," Frontiers in Neuroscience, vol. 16 (Apr. 14, 2022) 16 pp. (Year: 2022).*

(Continued)

*Primary Examiner* — Brian M Smith
(74) *Attorney, Agent, or Firm* — K&L Gates LLP

(57) ABSTRACT

Systems and methods are disclosed for enhancing artificial neural networks using a computationally modeled ephaptic coupling mechanism to improve adaptability, efficiency, and learning performance. An example system includes a virtual modulation device configured to dynamically adjust one or more ephaptic coupling hyperparameters within an ephaptically coupled artificial neural network (EC-ANN) architecture. The modulation device operates via a Bayesian optimization agent within a closed feedback loop, enabling control over intra-layer field interactions. The virtual modulation device further includes a graphical user interface (GUI) for visualizing training metrics, configuring hyperparameters, and monitoring decision-making by the Bayesian optimization agent, with options for manual override and automated control. The virtual modulation device is integrated with a public key infrastructure and one or more hardware security modules to securely sign, deploy, and manage trained EC-ANN models. Secure elements embedded in deployment devices are used to enforce cryptographic authentication, lifecycle management, and revocation of deployed models.

18 Claims, 10 Drawing Sheets

(56)　　　　　References Cited

U.S. PATENT DOCUMENTS

| 9,852,006 | B2 | 12/2017 | Akopyan | |
| 9,864,953 | B2 | 1/2018 | Adams | |
| 10,452,978 | B2 | 10/2019 | Shazeer | |
| 10,888,241 | B2 | 1/2021 | Siwoff | |
| 11,055,608 | B2 | 7/2021 | Bichler | |
| 11,763,139 | B2 | 9/2023 | Okazaki | |
| 2005/0283450 | A1* | 12/2005 | Matsugu | G06N 3/0464 706/20 |
| 2014/0358831 | A1 | 12/2014 | Adams | |
| 2016/0125304 | A1 | 5/2016 | Pizurica | |
| 2023/0038310 | A1* | 2/2023 | Yang | G06N 3/047 |
| 2024/0160944 | A1* | 5/2024 | Masse | G06N 3/084 |

OTHER PUBLICATIONS

Chen, Ding, et al. "Fully spiking actor network with intralayer connections for reinforcement learning." IEEE Transactions on Neural Networks and Learning Systems 36.2 (2024): 2881-2893.

Fan, Feng-Lei, et al. "Rethink depth separation with intra-layer links." arXiv preprint arXiv:2305.07037 (2023).

Javaheripi, Mojan, et al. "SWNet: Small-world neural networks and rapid convergence." arXiv preprint arXiv:1904.04862 (2019).

Lillicrap, Timothy P., et al. "Backpropagation and the brain." Nature Reviews Neuroscience 21.6 (2020): 335-346.

Tononi, Giulio. "An information integration theory of consciousness." BMC neuroscience 5 (2004): 1-22.

Rosenblatt, Frank. "The perceptron: a probabilistic model for information storage and organization in the brain." Psychological review 65.6 (1958): 386.

Rumelhart, David E., Geoffrey E. Hinton, and Ronald J. Williams. "Learning representations by back-propagating errors." nature 323. 6088 (1986): 533-536.

Von Neumann, John. "(1958) John von Neumann, The Computer and the Brain, New Haven: Yale University Press, pp. 66-82." (1988).

Werbos, Paul. "New tools for prediction and analysis in the behavioral science." Ph. D. dissertation, Harvard University (1974).

Hebb, Donald Olding. "The organization of behavior: A neuropsychological theory." Psychology press, 2005.

Householder, Alston S. "A theory of steady-state activity in nerve-fiber networks II: The simple circuit." The bulletin of mathematical biophysics 3 (1941): 105-112.

Householder, Alston S. "A theory of steady-state activity in nerve-fiber networks III: The simple circuit in complete activity." The bulletin of mathematical biophysics 3 (1941): 137-140.

Householder, Alston S. "A theory of steady-state activity in nerve-fiber networks: IV. N circuits with a common synapse." The bulletin of mathematical biophysics 4 (1942): 7-14.

Householder, Alston S. "Mathematical biophysics and the central nervous system." (1946).

Householder, Alston S. "A neural mechanism for discrimination." Psychometrika 4.1 (1939): 45-58.

McCulloch, Warren S., and Walter Pitts. "A logical calculus of the ideas immanent in nervous activity." The bulletin of mathematical biophysics 5 (1943): 115-133.

Minsky, Marvin. "Theory of Neural-Analog Reinforcement Systems and Its Application to the Brain-Model Problem." (PhD Thesis) Princeton University, 1954.

Pitts, Walter. "Some observations on the simple neuron circuit." The bulletin of mathematical biophysics 4 (1942): 121-129.

Pitts, Walter. "The linear theory of neuron networks: The dynamic problem." The bulletin of mathematical biophysics 5 (1943): 23-31.

Pitts, Walter. "The linear theory of neuron networks: The static problem." The bulletin of mathematical biophysics 4 (1942): 169-175.

Rashevsky, Nicolas. "Advances and applications of mathematical biology." (1940).

Shannon, Claude E. "A mathematical theory of communication." The Bell system technical journal 27.3 (1948): 379-423.

Shannon, Claude E. "A symbolic analysis of relay and switching circuits." Electrical Engineering 57.12 (1938): 713-723.

Shannon, Claude E., and Warren Weaver. "The Mathematical Theory of Communication". Urbana: University of Illinois Press (1949).

Werbos, Paul J. "Applications of advances in nonlinear sensitivity analysis." System Modeling and Optimization: Proceedings of the 10th IFIP Conference New York City, USA, Aug. 31-Sep. 4, 1981. Berlin, Heidelberg: Springer Berlin Heidelberg, 2005.

Fukushima, Kunihiko. "Neocognitron: A self-organizing neural network model for a mechanism of pattern recognition unaffected by shift in position." Biological cybernetics 36.4 (1980): 193-202.

LeCun, Yann, et al. "Gradient-based learning applied to document recognition." Proceedings of the IEEE 86.11 (2002): 2278-2324.

Darlow, Luke, et al. "Continuous Thought Machines." arXiv preprint arXiv:2505.05522 (2025).

Householder, Alston S. "A theory of steady-state activity in nerve-fiber networks I: Definitions and preliminary lemmas". The Bulletin of Mathematical Biophysics (1941).

Cunha, Gabriel Moreno, et al. "Can ephapticity contribute to brain complexity?." PloS one 19.12 (2024): e0310640.

Cunha, Gabriel Moreno, et al. "Ephaptic entrainment in hybrid neuronal model." Scientific reports 12.1 (2022): 1629.

Orenstein, David. "Brain Networks Encoding Memory Come Together via Electric Fields, Study Finds." MIT News, Jul. 24, 2023.

Pinotsis, Dimitris A., Gene Fridman, and Earl K. Miller. "Cytoelectric coupling: Electric fields sculpt neural activity and "tune" the brain's infrastructure." Progress in Neurobiology 226 (2023): 102465.

Pinotsis, Dimitris A., and Earl K. Miller. "In vivo ephaptic coupling allows memory network formation." Cerebral Cortex 33.17 (2023): 9877-9895.

Shifman, Aaron R., and John E. Lewis. "Elfenn: a generalized platform for modeling ephaptic coupling in spiking neuron models." Frontiers in Neuroinformatics 13 (2019): 35.

Anastassiou, Costas A., et al. "Ephaptic coupling of cortical neurons." Nature neuroscience 14.2 (2011): 217-223.

Seltzer, Zeev et al. "Ephaptic transmission in chronically damaged peripheral nerves." Neurology 29.7 (1979): 1061-1061.

Jones, Jeremiah. Drift-Diffusion Simulation of the Ephaptic Effect in the Triad Synapse of the Retina. Arizona State University, 2013.

Adrian, Edgar Douglas. The mechanism of nervous action: electrical studies of the neurone. University of Pennsylvania Press, 2016.

Arvanitaki, A. "Effects evoked in an axon by the activity of a contiguous one." Journal of neurophysiology 5.2 (1942): 89-108.

Chen, Yutian, et al. "Bayesian optimization in AlphaGo." arXiv preprint arXiv:1812.06855 (2018).

Mercioni, Marina Adriana, et al. "Dynamic modification of activation function using the backpropagation algorithm in the artificial neural networks." IJACSA) International Journal of Advanced Computer Science and Applications 10.4 (2019).

Ravichandran, Naresh, Anders Lansner, and Pawel Herman. "Unsupervised representation learning with Hebbian synaptic and structural plasticity in brain-like feedforward neural networks." arXiv preprint arXiv:2406.04733 (2024).

Konyushova, Ksenia, et al. "Active offline policy selection." Advances in Neural Information Processing Systems 34 (2021): 24631-24644.

Snoek, Jasper, Hugo Larochelle, and Ryan P. Adams. "Practical bayesian optimization of machine learning algorithms." Advances in neural information processing systems 25 (2012).

Kim, Khu-rai, Youngjae Kim, and Sungyong Park. "A probabilistic machine learning approach to scheduling parallel loops with Bayesian optimization." IEEE Transactions on Parallel and Distributed Systems 32.7 (2020): 1815-1827.

Jaderberg, Max, et al. "Population based training of neural networks." arXiv preprint arXiv:1711.09846 (2017).

Aglietti, Virginia, et al. "FunBO: Discovering Acquisition Functions for Bayesian Optimization with FunSearch." arXiv preprint arXiv:2406. 04824 (2024).

* cited by examiner

ENHANCING ARTIFICIAL NEURAL NETWORKS WITH EPHAPTIC COUPLING

CROSS-REFERENCE TO RELATED APPLICATIONS

This application claims the benefit of U.S. Provisional Patent Application 63/795,180 filed Apr. 25, 2025, U.S. Provisional Patent Application 63/815,605, filed May 31, 2025, and U.S. Provisional Patent Application 63/817,145, filed Jun. 3, 2025, the entire contents of all of which are incorporated herein by reference.

FIELD OF THE INVENTION

The present invention relates to artificial intelligence (AI) and machine learning (ML), specifically to building, training and securely deploying artificial neural network (ANN) architectures incorporating the ephaptic coupling mechanism. This biologically-inspired, computational mechanism can be applied to any class of ANN, which would be hereafter referred to as Ephaptically Coupled Artificial Neural Network (EC-ANN). Unlike a typical ANN which rely solely on weighted synaptic connections modelled using a matrix, an EC-ANN utilize a new, switchable, scalable, learnable, and tunable, ephaptic coupling matrix engine that modulates activations based on intra-layer interactions.

BACKGROUND OF THE INVENTION

ANNs typically model interactions similar to axodendritic synapses. In biological neurons, axodendritic synapses involve axons transmitting signals to dendrites, integrating these inputs at the neuron's soma to determine firing. Similarly, ANNs typically receive weighted input signals, sum them, apply a non-linear activation function, and pass the signal onward, closely paralleling axodendritic integration and excitation in biological neurons.

SUMMARY OF THE INVENTION

The term synapse was introduced in 1897 by the English physiologist Charles Sherrington. The term was coined to describe the junction between two biological neurons, where communication occurs. The word synapse comes from the Greek synaptein, which means "to clasp together" or "to join".

A synapse allows signals to pass via neurotransmitters. The human brain is estimated to have 100 trillion to 1,000 trillion ($10^{14}$ to $10^{15}$) synapses. Each neuron in the brain forms thousands of synapses with other neurons. On average, a single neuron has 1,000 to 10,000 synaptic connections. With about 86 billion neurons, this results in an estimated 100 to 1,000 trillion synapses. The number of synapses is not fixed as they increase or decrease based on learning, memory, and brain plasticity. For instance, children have more synapses (about 1,500 trillion), but pruning has been demonstrated to occur as the brain optimizes connections.

The traditional computation model of ANNs, which has been centered around synaptic transmission (e.g. via synapses), does not consider another parallel communication mechanism that has been often overlooked by neuroscientists and not take into account by AI/ML researchers. This parallel point communication is called the ephapse.

Introduced in 1941 by French neurophysiologist Angélique Arvanitaki, the word ephapse is from the Greek ephapsis meaning "to touch". It is defined as a site of functional interaction between two or more neurons where communication occurs not through traditional synaptic transmission, but through local electric fields that allow one neuron's activity to influence the membrane potential of another. This biological phenomenon is known as ephaptic coupling.

The exact number of ephapses in the human brain is not precisely known, as ephaptic coupling is still a relatively underexplored aspect of neural communication. However, based on estimates of neuron density, extracellular field effects, and observed ephaptic interactions, it is suggested that ephaptic interactions may be as numerous as, or even exceed, synaptic connections in certain brain regions. Ephaptic interactions do not require direct physical connections, meaning that any neuron within an extracellular field can potentially influence nearby neurons. If even 10% of neurons engage in ephaptic interactions, this could result in at least 10 trillion ephaptic connections. In densely packed regions such as the cerebellum, hippocampus, and neocortex, where neurons are closely aligned, ephaptic interactions could be as frequent as synapses or even outnumber them. Other researchers hypothesize that ephaptic effects may be a pervasive, secondary layer of communication that dynamically influences a much larger network of neurons than traditional synaptic connections alone. While no definitive count exists, ephaptic interactions could rival or exceed synaptic connections in certain neural circuits, potentially making them an important but underappreciated mechanism in brain function.

Ephaptic coupling has historically been overlooked, even within neuroscience, often described as a "spooky" phenomenon due to the difficulty of measuring its effects. However, later experimental and computational studies, most notably by Anastassiou et al. in 2011, provided compelling evidence for its functional relevance. Ephaptic coupling is now understood as a non-synaptic form of neuronal communication, in which neurons influence the excitability of neighboring cells through localized extracellular electric fields rather than relying solely on chemical synapses. These interactions (i.e., ephapses) arise from the close spatial proximity of neuronal membranes, allowing the electric field generated by one neuron's activity to modulate the membrane potential of adjacent neurons.

Ephaptic coupling involves ionized atoms, specifically ions such as sodium ($Na^+$), potassium ($K^+$), calcium ($Ca^{2+}$), and chloride ($Cl^-$), whose movements across neuronal membranes generate changes in ionic concentrations and subsequently create localized electrical fields. These ionic currents produce extracellular field potentials that alter the membrane potential of neighboring neurons, modulating their excitability and the probability of firing action potentials without direct chemical neurotransmitter exchange. As a subtle form of interaction between biological neurons, ephaptic coupling is still not well understood and has been often dismissed as negligible and unimpactful. Myelination is believed to reduce or prevent these ephaptic effects, limiting their role in certain neural circuits.

Most recent studies such as Cunha et al. in 2022 and 2023 demonstrated that ephaptic coupling may be significantly influencing neuronal firing timing and synchronization. They reported the role of ephaptic coupling in neural network complexity using the Quadratic Integrate-and-Fire Ephaptic (QIF-E) hybrid model. They demonstrated that ephaptic interactions enhance complexity, especially in small-world network topologies. Using Multiscale Entropy (MSE) analysis, their studies showed networks with active ephaptic coupling have higher entropy, reflecting more intricate neuronal activity. The research highlighted an inverse relationship between synaptic strength and network complexity, emphasizing ephaptic interactions' modulatory role. The research underscores ephaptic coupling as a significant form of neural communication, particularly in brain regions like the hippocampus and neocortex. While focused on biological neural networks, the findings suggest potential inspiration for developing novel ANN architectures with increased adaptability. However, the study did not propose ANN-specific activation, learning, training or optimization methods.

Current biological simulation tools of ephaptic coupling include QIF-E and Electric Field Effects in Neural Networks (ELFENN). QIF-E is a computational model designed to simulate the effects of electric fields on neuronal behavior, specifically focusing on ephaptic coupling. This model adapts the traditional Quadratic Integrate-and-Fire (QIF) neuron model to incorporate ephaptic interactions, allowing researchers to study how electric fields influence neuronal dynamics. The QIF-E model has been validated against empirical data, demonstrating its effectiveness in replicating observed neuronal behaviors under the influence of electric fields. ELFENN is a MATLAB-based open-source toolbox developed to provide a generalized platform for modeling ephaptic coupling in biological spiking neuron models. It allows researchers to incorporate the effects of extracellular electric fields into their biological neuronal network simulations, facilitating the study of how such fields influence neuronal activity and network behavior.

Both QIF-E and ELFENN provide valuable insights into the non-synaptic interactions mediated by electric fields. Although these tools model ephaptic effects, they do not translate them into an ANN-compatible function. Moreover, they do not provide a functional learning framework for ANN applications. Lastly, QIF-E and ELFENN primarily use linear approximations of ephaptic coupling, whereas this invention introduces a non-linear function for more flexible and biologically realistic adaptation in ANN architectures.

Despite its biological significance and potential relevance to AI systems, ephaptic coupling has yet to be canonically modeled by the AI community at large, and by deep learning researchers in particular. In fact, standard ANNs do not even account for the diversity of synapse types observed in biological systems, such as axosomatic, axoaxonic, or dendrodendritic synapses, thereby limiting their fidelity as models of real neuronal behavior. They are often portrayed as "cartoon neurons" by the neuroscientific community. It is important to note that an axoaxonic synapse is structurally and functionally distinct from an ephapse, even though both involve interactions at the axonal level. An axoaxonic synapse consists of a direct anatomical connection in which the axon terminal of one neuron modulates the axon of another neuron, typically through the release of chemical neurotransmitters that regulate synaptic strength and transmitter release. In contrast, ephaptic coupling is a non-synaptic and passive form of interaction in which neurons situated in close spatial proximity influence one another's excitability through local extracellular electric fields, without the involvement of synaptic vesicles or chemical signaling. Whereas axoaxonic synapses are structured, unidirectional, and energy-dependent, ephaptic interactions are non-structured, bidirectional, and mediated solely by physical electric field effects.

Such EC-ANN model is still not publicly available to the skilled in the art at the time of this writing. In other words, existing ANN models fail to capture the ephaptic coupling mechanism, potentially limiting their efficiency and biological plausibility. The technical challenge may also be that ANNs are typically represented by matrices, relying on solving linear equations to their generalization problems, and that conventional wisdom is that row operations (i.e. synaptic operations) and not column operations (i.e. ephaptic operations) are used. This invention is thus contemplating such atypical and non-obvious mode of communication as an enhancement to traditional synaptic ANNs by breaking free from the synapse-centric paradigm since Frank Rosenblatt developed the perceptron in 1958. Incorporating EC-ANN should allow emergent, non-learning dynamics in standard ANNs.

EC-ANNs are first introduced in U.S. Provisional Patent Application No. 63/795,180, filed Apr. 25, 2025, titled "System, Methods and Apparatus for Enhancing Artificial Neural Networks Using Ephaptic Coupling," followed by U.S. Provisional Patent Application No. 63/815,605, filed May 31, 2025, titled "Virtual Modulation Device for EC-ANNs Using Bayesian Optimization," and U.S. Provisional Patent Application No. 63/817,145, filed Jun. 3, 2025, titled "Enhancing Artificial Neural Networks with Ephaptic Coupling," each of which is incorporated herein by reference in its entirety. These original disclosures proposed a novel general computational model that extends the classical artificial neuron by incorporating structured intra-layer modulation inspired by ephaptic coupling, a non-synaptic biological communication mechanism. This formulation introduces adaptive, differentiable intra-layer interactions that complement traditional synaptic, inter-layer dynamics. The result is a unified architecture applicable to any artificial neural network (ANN), enhancing its expressiveness, efficiency, robustness, and convergence across domains.

Preliminary experimental results based on the implementation of this invention demonstrate that ephaptic coupling yields substantial and consistent performance improvements across multiple domains of machine learning. In natural language processing, models incorporating the disclosed mechanisms achieved a significant reduction in language modeling error, reflected by a decrease of over 70% in perplexity on a standard benchmark. In computer vision tasks, classification accuracy improved by over 3% on a widely used dataset, exceeding the margin of typical gains reported by architectural modifications. In reinforcement learning environments, the invention delivered an average reward increase exceeding 6%, indicating more efficient policy learning and improved decision-making. These results highlight the generality and effectiveness of the approach across distinct neural network architectures and tasks, including sequence modeling, image classification, and agent-based control.

It is anticipated that the integration of ephaptic coupling into ANNs is not merely a scientific advancement. It suggests a potential paradigm shift with broad commercial implications. As computing power, particularly GPU availability and utilization, becomes the primary bottleneck in scaling AI systems., the cost of compute, energy, and time has emerged as a defining constraint for deep learning models that continue to grow in size and complexity. EC-ANNs offer a promising alternative by enabling more efficient learning dynamics, faster convergence, and potentially leaner architectures, all of which could translate directly into substantial value across AI-driven sectors.

Training large-scale models such as GPT-style transformers, ResNets, or diffusion models routinely incurs compute costs ranging from hundreds of thousands to tens of millions of dollars per model. Inference and retraining workloads for cloud services amplify these expenses at global scale. EC-ANNs, by adding intra-layer field-based modulation, have demonstrated faster convergence in multiple empirical settings. A reduction of even 10 to 20% in training time across major AI workflows, achieved through more efficient representational learning, could conservatively save enterprises and research labs hundreds of millions of dollars annually. In hyperscaler environments, this could possibly extend to billions.

The hardware implications are equally striking. Training a modern LLM can consume tens of megawatt-hours (MWh) of energy, often spread across thousands of GPUs. If ephaptic coupling enables models to reach desired performance in fewer steps or with reduced overparameterization, it directly reduces the total energy footprint. Given that state-of-the-art data centers often draw 2 to 5 megawatts continuously, even marginal efficiency gains at the algorithmic level yield measurable reductions in electricity demand, carbon emissions, and cooling requirements. This supports the dual goals of profitability and sustainability.

Moreover, EC-ANNs may reduce the need for brute-force scaling. Today's models require massive width and depth to compensate for representational inefficiencies. With ephaptic coupling enhancing intra-layer communication, similar performance may be achieved with smaller networks, thereby reducing parameter count, storage demands, and latency during inference. For edge AI applications, this could unlock new revenue streams in power- or size-constrained environments such as robotics, wearables, and mobile devices. As AI continues to integrate with industries such as healthcare, finance, logistics, and autonomous systems, the ability to train more capable models with fewer resources becomes a strategic differentiator. Companies that integrate ephaptic coupling early could enjoy faster model turnaround, lower cloud bills, and a competitive edge in deployment efficiency. Given the global AI market is projected to exceed $1 trillion by the end of the decade, even modest adoption of EC-ANNs could yield billions in economic impact across the AI value chain.

Looking ahead, the convergence of AI, blockchain, and 5G/6G technologies will demand even greater model adaptability and energy efficiency. EC-ANNs position themselves as a foundational upgrade to the neural layer itself, capable of accelerating learning while reducing operational costs across a wide range of infrastructure and application contexts. The ephaptic coupling mechanism, when integrated into ANNs, is not just a new learning signal, but also an exciting opportunity to realign the economics of deep learning.

The preliminary results demonstrate that EC-ANNs deliver superior learning efficiency and performance across vastly different modalities. In language modeling, EC-ANNs show substantial reductions in perplexity and loss, achieved in only 10K step, indicating potential reductions in compute cycles for large-scale model training. In computer vision, improved accuracy and reduced loss on CIFAR-100 after just 20K steps suggest a faster convergence trajectory. In reinforcement learning, EC-ANN improves reward by 6.67% over baseline PPO at 1 million timesteps, implying that fewer environment interactions are required to reach equivalent performance.

Taken together, these findings suggest that EC-ANNs not only enhance model expressiveness but also yield practical time, compute, and energy savings. This positions ephaptic coupling as a foundational advancement in neural network design with significant implications for modern AI workloads.

The use of EC-ANNs leads to measurable improvements in training efficiency and reductions in computational and energy resource requirements. To reach a given performance threshold (e.g. average reward of 3900), EC-ANN requires fewer training steps than standard baseline. This implies fewer gradient updates, fewer environment interactions, and less wall-clock time on equivalent hardware. In effect, this represents a tangible time savings.

In terms of compute efficiency, the number of floating-point operations (FLOPs) per forward and backward pass remains comparable between EC-ANN and standard baseline, since A introduces no additional layers. However, if EC-ANN converges in 800,000 steps instead of 1 million, that equates to a 20% reduction in compute requirements to reach the same performance level.

Energy efficiency follows from compute savings. Using standard hardware energy models, typically ~50 to 200 nJ per multiply-accumulate (MAC) operation, a 20% reduction in training steps corresponds to an estimated 20% reduction in total energy consumed for forward and backward passes, assuming constant batch size and hardware configuration.

Estimated wall-clock training time decreased from 5 hours to 4 hours, and relative energy consumption dropped from 100% to 80%, further confirming a 20% savings in energy use. These findings highlight the resource efficiency advantages of ephaptic coupling.

To support these claims with further rigor, future experiments may include tracking time-to-threshold (e.g., wall-clock time to reach average reward $\geq 3900$); logging the number of updates or epochs to convergence; profiling FLOPs using tools such as torchprofile or ptflops; and estimating or directly measuring energy usage using runtime profilers such as NVIDIA Nsight or PyTorch Profiler.

In addition to absolute performance improvements, EC-ANNs enable new ways to measure efficiency through relative metrics. These include sample efficiency, defined as reward per timestep; compute efficiency, measured as reward per model update; and energy efficiency, estimated as reward per joule consumed. These metrics provide a more nuanced view of how effectively the model learns under resource constraints, and position ephaptic coupling as a promising mechanism for environments where optimization of training cost and throughput is critical.

Optimizing the performance of EC-ANNs involves tuning multiple interdependent hyperparameters including the ephaptic factor ($\varepsilon$), initialization magnitude ($\lambda_o$), connectivity factor ($\kappa$), the structure of the ECM A, and modulation frequency. Manual tuning of these hyperparameters is not only time-consuming, but also impractical at scale. There is a growing need for adaptive, intelligent, and domain-agnostic systems that can automate this tuning process based on real-time feedback. This invention addresses that need through the creation of a Virtual Modulation Device controlled by a Bayesian optimization agent, which autonomously adjusts ephaptic hyperparameters within EC-ANNs in a closed-loop fashion.

This invention introduces a general-purpose, field-based modulation layer that enhances any ANN with a new axis of control. Given that even 1% top-end gains are worth billions in high-stakes domains, the value of this invention, as a drop-in performance optimizer, positions it as a billion-dollar asset in the modern AI arms race. Indeed, a 1% improvement is not just more upside, it is also less downside. EC-ANNs could effectively reduce cost, risk, and inefficiency across the AI pipeline. This would hold significant strategic and operational value.

The ECM engine serves as a field-based modulation engine, functioning similarly to how ephaptic coupling influences biological neurons. Unlike traditional self-attention, where weights are discretely updated per forward pass, the ECM would provide continuous, dynamic influence between neurons or tokens, adjusting interactions in real time. Instead of using softmax-based attention scores, each value in the ECM would represent an ephaptic-like influence that modifies activations based on the overall activity of the network. This approach would allow for more fluid, adaptive learning, reducing reliance on explicit weight updates and making AI more biologically inspired. The ECM could potentially enhance self-organizing learning mechanisms, leading to AI models that evolve interaction strengths dynamically, rather than being constrained by predefined, static weights. In other words, rather than replacing self-attention entirely, combining it with an ECM could lead to a more powerful, adaptive AI model. This hybrid approach would leverage the structured representation of self-attention while incorporating the real-time adaptability of ephaptic interactions, leading to more flexible, efficient, and biologically plausible AI systems.

This invention introduces first the EC-ANN model integrating a novel computational model of ephaptic coupling alongside the standard synaptic weight term. The model incorporates an ECM into the activation function, allowing neurons to affect nearby neurons through dynamically modulating neural influence. The activation function applies column-wise ephaptic influence to directly modify activations without needing weight adjustments. This introduces parallel processing and self-organization, which result in improved neural synchronization, faster learning, enhanced computational efficiency, and potentially significant adaptability with real-time feature extraction. The invention also introduces a custom neuromorphic hardware and a novel security mechanism.

This invention also introduces a Virtual Modulation Device for dynamic ephaptic modulation of multiple neural hyperparameters in EC-ANNs, using a Bayesian Optimization Agent operating within a closed feedback loop. The Virtual Modulation Device interfaces with EC-ANN training pipelines, modulating ephaptic parameters based on performance feedback. Unlike static hyperparameter tuning tools, this Virtual Modulation Device enables adaptive, probabilistically guided real-time control over intra-layer field dynamics. The Virtual Modulation Device includes an Ephaptic Modulation Interface consisting of a Graphical User Interface (GUI) that allows visualizing live training metrics, configure modulation parameters, and monitor the Bayesian agent's decision-making process, providing both manual override and automated control modes. The GUI displays real-time performance against a baseline, using ephaptic coupling parameters dynamically adjusted via the Virtual Modulation Device.

BRIEF DESCRIPTION OF THE DRAWINGS

The figures included and briefly described below illustrate the topology, activation, and learning of example systems and methods implementing an EC-ANN and its integration with a Virtual Modulation Interface.

This flow diagram illustrates the activation mechanism of the ANN model enhanced with ephaptic coupling.

Figure 4:
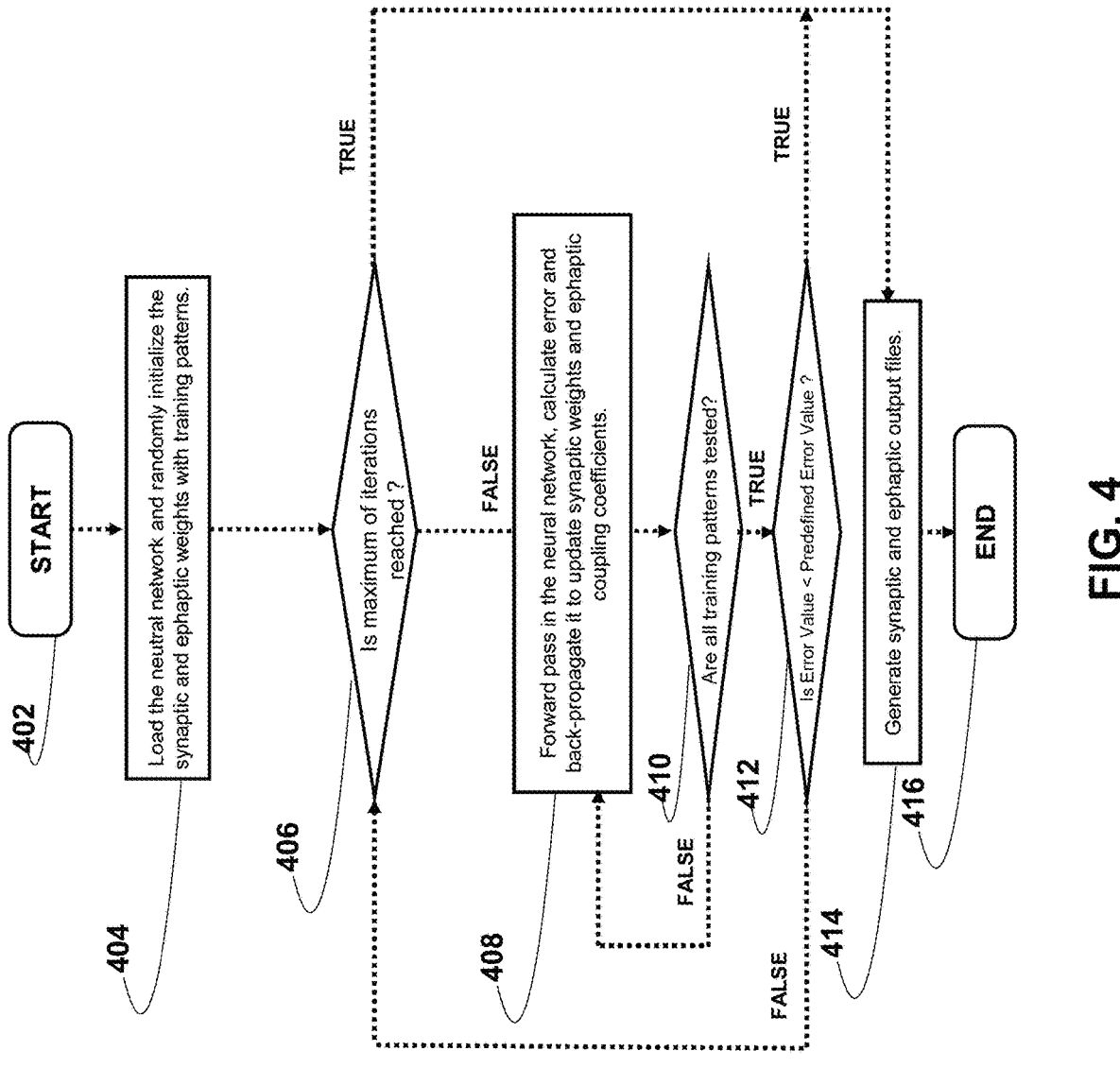

FIG. 4 Learning Method:

This flow diagram illustrates the training mechanism of the ANN model enhanced with ephaptic coupling.

Figure 5:
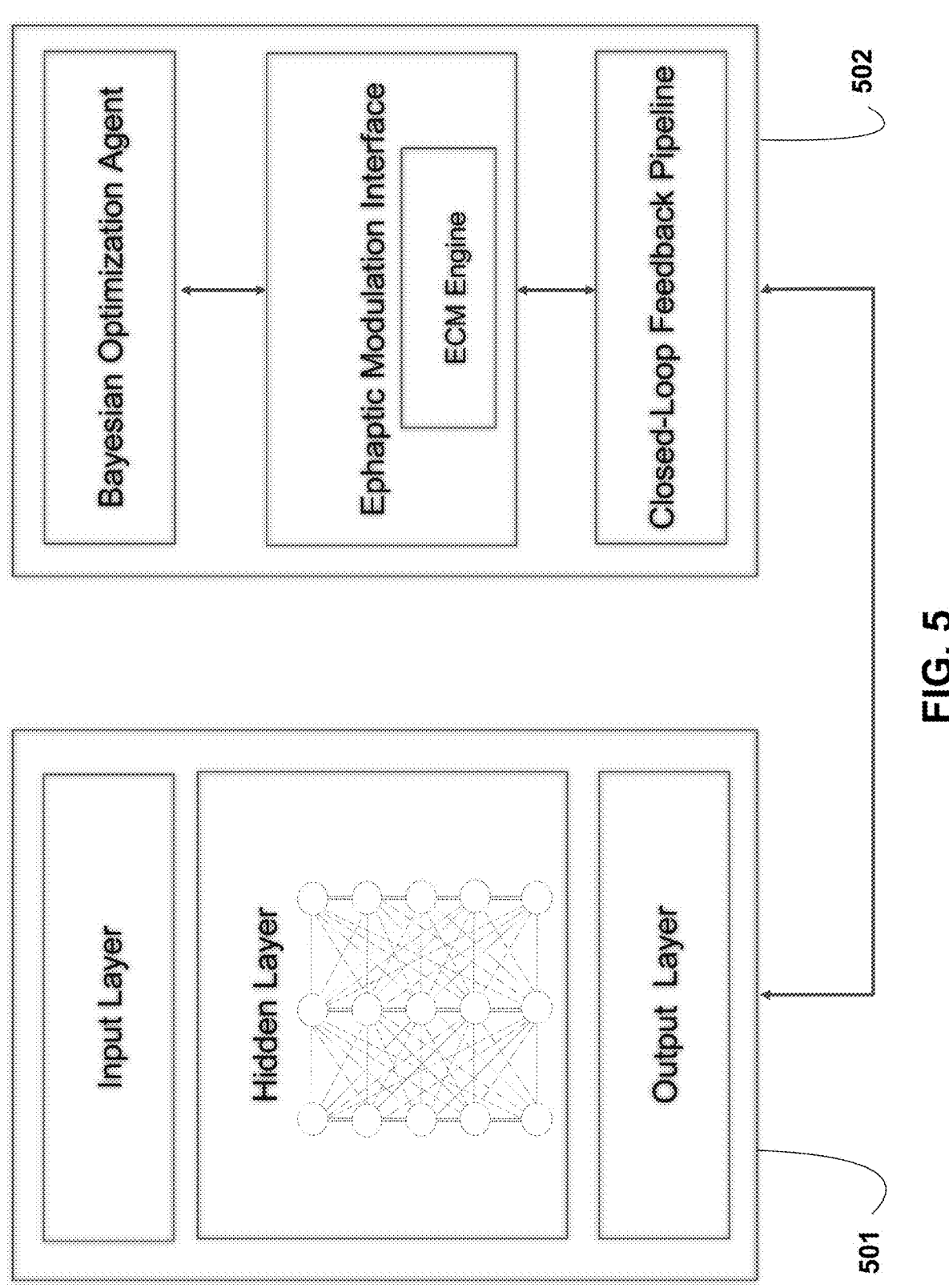

FIG. 5 Training System Diagram:

This drawing illustrates the high-level system architecture integrating an EC-ANN model 401 with a Virtual Modulation Device 402 consisting of a Bayesian optimization agent, Ephaptic Modulation Interface and a Closed-Loop Feedback Pipeline.

Figure 6:
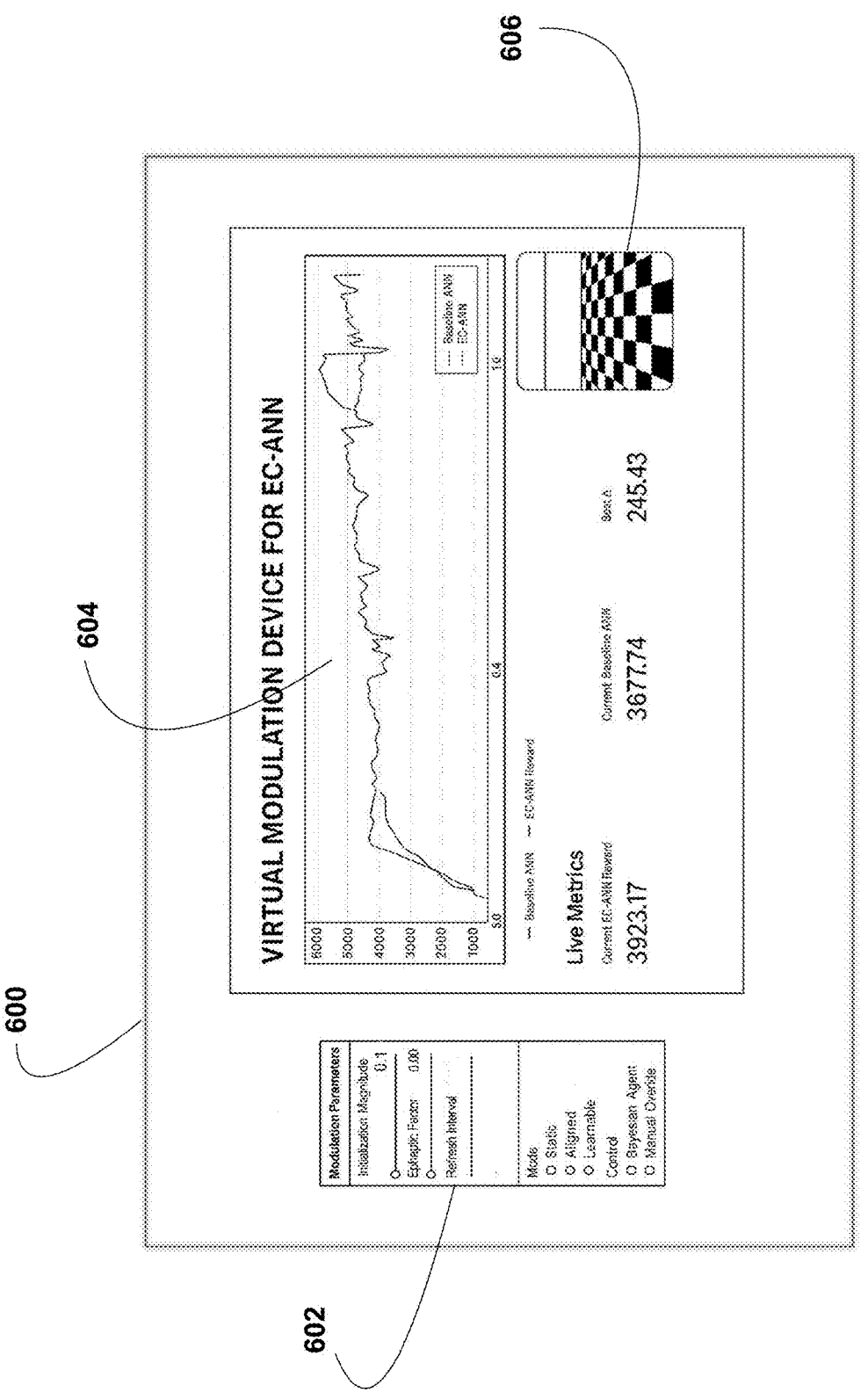

FIG. 6 Virtual Modulation Device GUI:

This enhanced screenshot is a mockup of an example GUI of a virtual modulation device.

Figure 7:
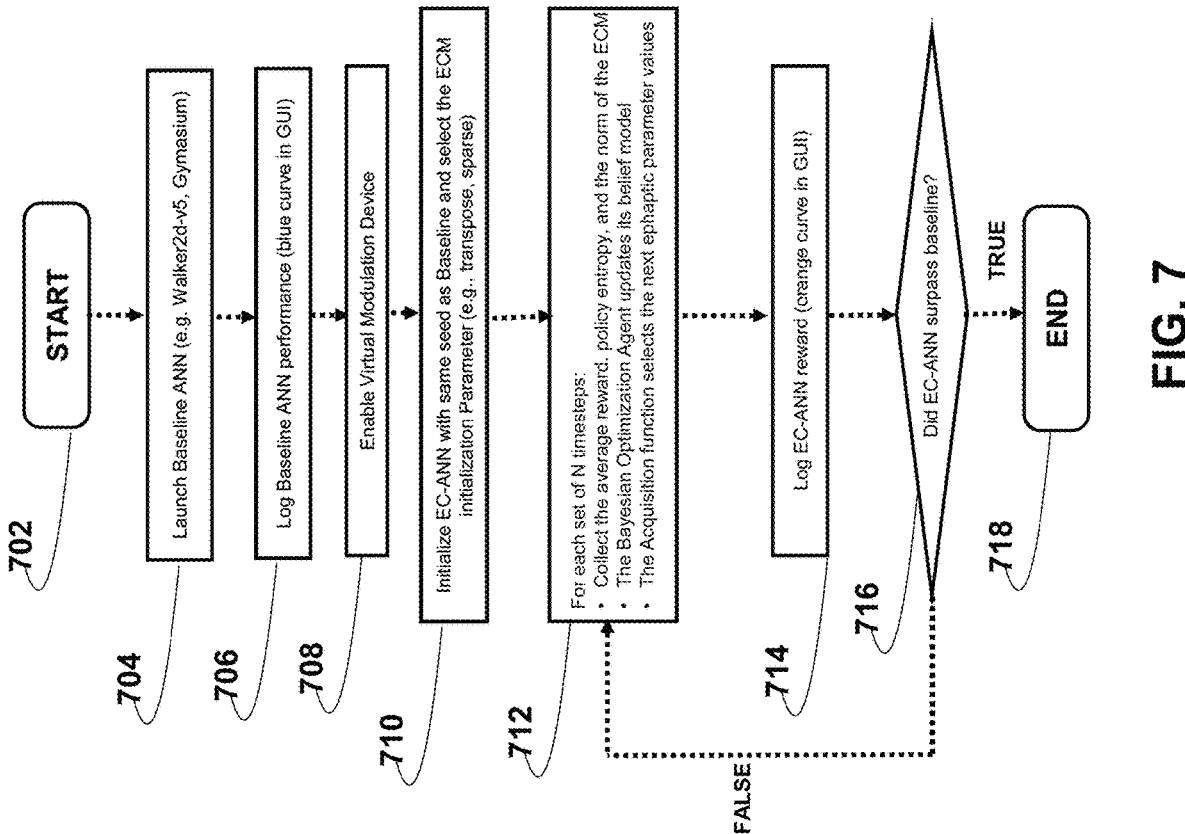

FIG. 7 Closed-Loop EC-ANN Modulation Process:

This flowchart begins with performance metric collection, proceeds through probabilistic inference, and applies modulation via the virtual device. Decision points determine whether to refresh A or decay $\zeta$, based on observed metrics.

Figure 8:
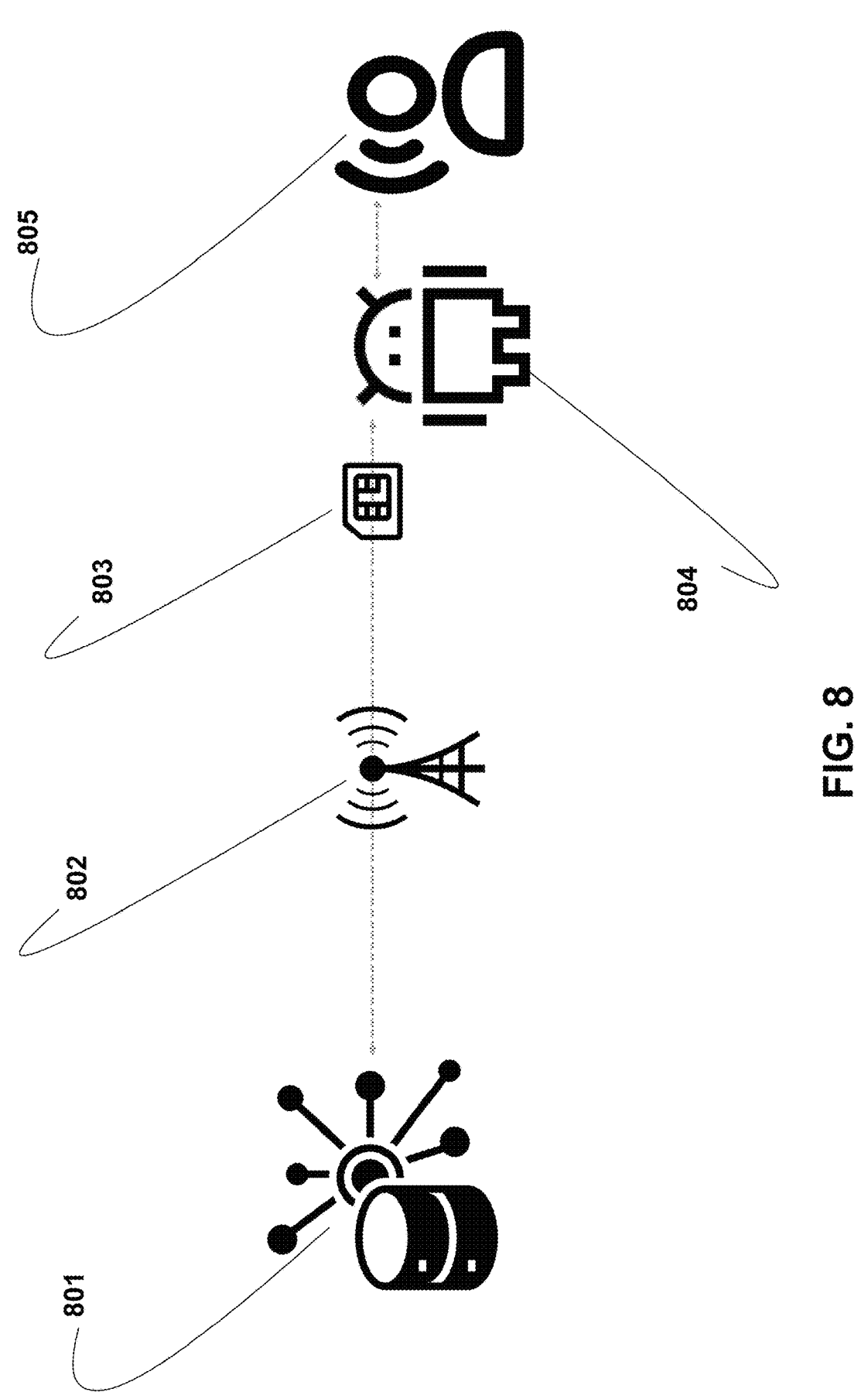

FIG. 8 Remote Kill Switch System: This diagram provides an illustration of the external functional components involved in the "remote kill switch" mechanism for disabling or terminating an ANN enhanced with ephaptic coupling.

Figure 9:
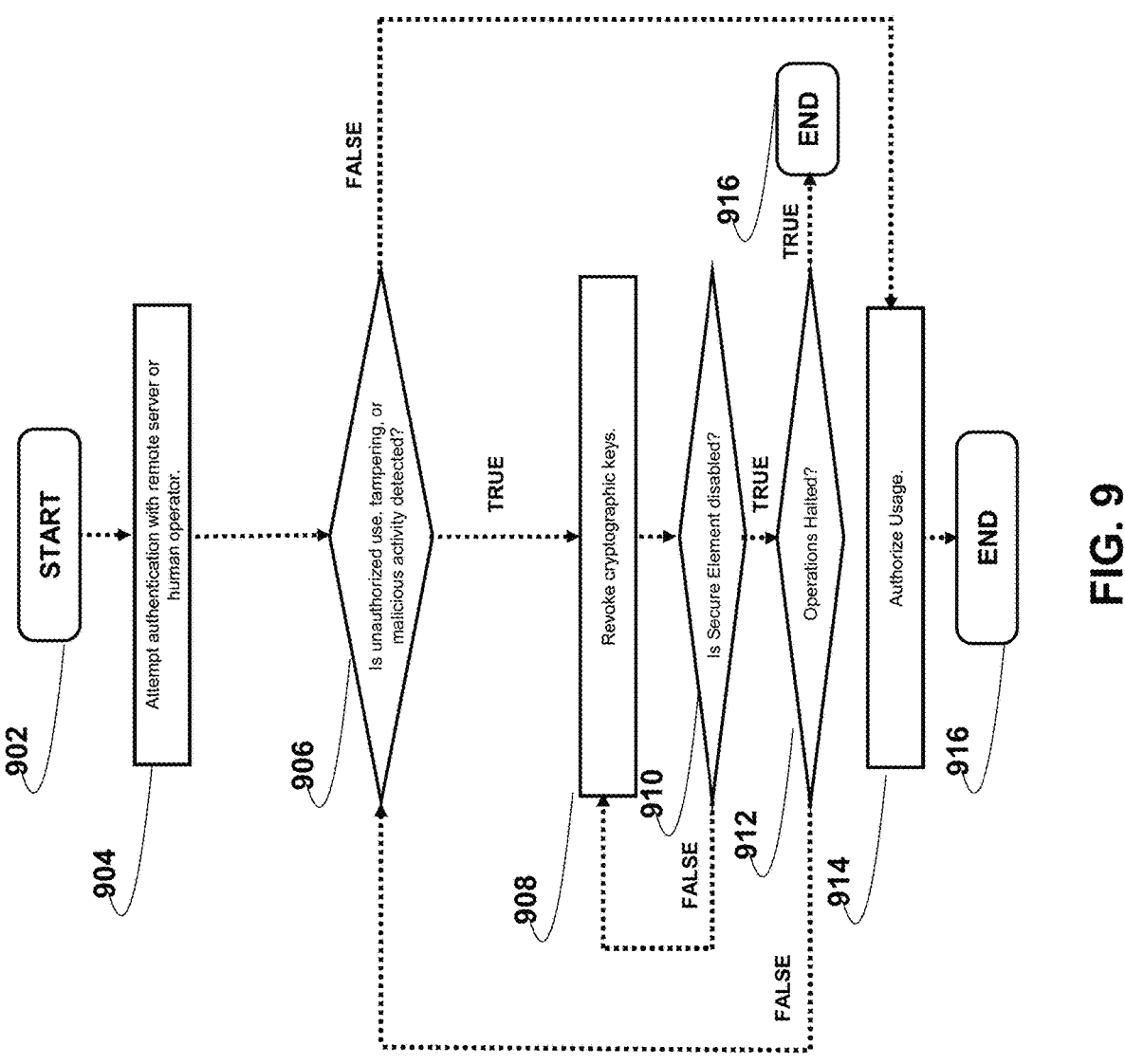
Figure 10:
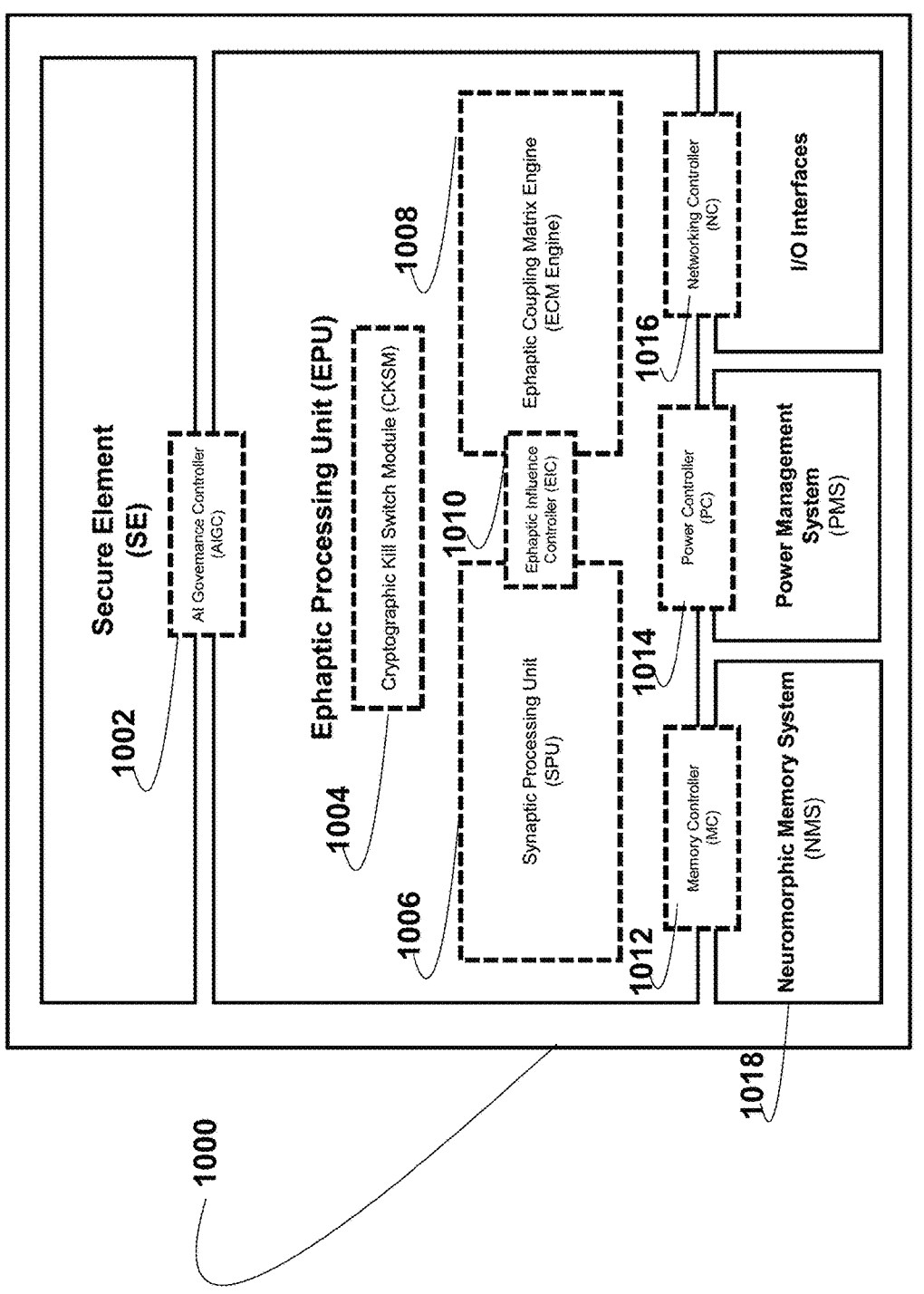

FIG. 9 Remote Kill Switch Method:

This flow diagram illustrates the disabling or terminating operation of an EC-ANN FIG. 10 Neuromorphic Ephaptic SoC This block illustrates a custom hardware natively supporting synaptic and ephaptic operations

DETAILED DESCRIPTION OF THE INVENTION

Ephaptic Coupling:

Ephaptic coupling refers to non-synaptic electrical communication between biological neurons through ephapses, which are sites of interaction between adjacent neurons, unlike synapses, which transmit signals across non-adjacent gaps. This natural phenomenon, observed in the hippocampus, cortex, retina, and cerebellum (Arvanitaki, 1942; Anastassiou et al., 2011), enables biological neurons to influence one another via extracellular electric fields, independent of synaptic transmission. Recent research (Cunha et al., 2022; Pinotsis et al., 2023) suggests ephaptic coupling plays an increasingly important role in synchronizing biological neural networks.

Applied to the field of AI, which remains primarily synaptic in structure, ephaptic coupling allows ANNs to introduce a trainable intra-layer modulation term that computationally simulates field-mediated interactions. This forms a biologically grounded extension of the artificial neuron model introduced by Rosenblatt in 1958, encompassing both single-layer and multilayer perceptrons (MLP). Ephaptic coupling effectively turns a classical neural layer (also referred to as a layer) into a 2D field of fully interconnected neurons. As a general-purpose mechanism, ephaptic coupling can accelerate learning across domains when integrated into standard ANN architectures. EC-ANNs were first disclosed in provisional patent application No. 63/795,180 filed on Apr. 25, 2025.

Topology:

EC-ANNs differ topologically from standard ANNs as they introduce a second matrix representing intra-layer interactions. In a standard feedforward ANN, the output of each hidden neuron is computed using a weight matrix W and bias vector b. The standard ANN model also typically processes activations row-wise (neuron-wise). In EC-ANNs, we define a second matrix $\Lambda$, which modulates activations column-wise, enabling intra-layer communication. In other words, W governs the feedforward signal propagation, while $\Lambda$ models field-based modulation within the same layer. Together, these matrices create a hidden layer with dual axes of communication with both synaptic, row-wise communication whereby a neuron receives input from the previous layer, and ephaptic, column-wise communication whereby a neuron receives modulation from intra-layer peers.

The first matrix W encodes the traditional synaptic weights connecting inputs to hidden neurons. Each row corresponds to one hidden neuron receiving inputs from all previous-layer neurons. The second matrix A captures internal interactions among hidden neurons. Each off-diagonal entry $\Lambda_{ik}$ represents the influence of neuron k on neuron i within the same layer. Self-modulation, where a neuron influences itself may be optionally omitted by setting diagonal entries to zero.

Computation Model:

The general formulation includes minor refinements but remains consistent with what was disclosed in the original provisional patent applications. They build on the core mechanism without departing from the originally described invention.

In EC-ANN, the artificial neuron's output is defined as a function of two distinct inputs: synaptic input term $S_i$ and ephaptic coupling $E_i$. This is canonically expressed as:

$$y_i = f(S_i, E_i) \tag{1}$$

Where:

$y_i$ is the output activation of neuron i, f is the global non-linear activation function (e.g., Identity, SiLU, ReLU, tanh), $S_i$ is the synaptic input to neuron i, and $E_i$ is the ephaptic influence on neuron i.

The scalar form of the general activation equation for an EC-ANN, describing the activation of neuron i, influenced by neuron j in a preceding layer (synaptic input), and neurons k in the same layer (ephaptic coupling), consists of two core components: a synaptic term and an ephaptic term.

The synaptic term $S_i$ is defined by:

$$S_i = \sum_j W_{ij} x_j + b_i \tag{2}$$

Where:

$S_i$ is the synaptic input to neuron i, $W_{ij}$ is the synaptic weight from neuron j to neuron i, $x_j$ is the post-synaptic activation of neuron j from the previous layer, and $b_i$ is the bias term for neuron i.

The ephaptic coupling term $E_i$ is defined by:

$$E_i = \varepsilon \sum_k \Lambda_{ik} \Phi(x_k) \tag{3}$$

Where:

$E_i$ is the ephaptic coupling term acting on neuron i, $\varepsilon$ is the ephaptic factor scalar regulating the strength of ephaptic coupling, $\Lambda_{ik}$ is the ephaptic coupling coefficient from neuron k to neuron i, $\Phi$ is the nonlinear transformation of post-activation of neuron k (e.g., Identity, SiLU, ReLU, tanh), and $x_k$ is the post-synaptic, pre-ephaptic activation of neuron k within the same layer as neuron i.

Figure 1:
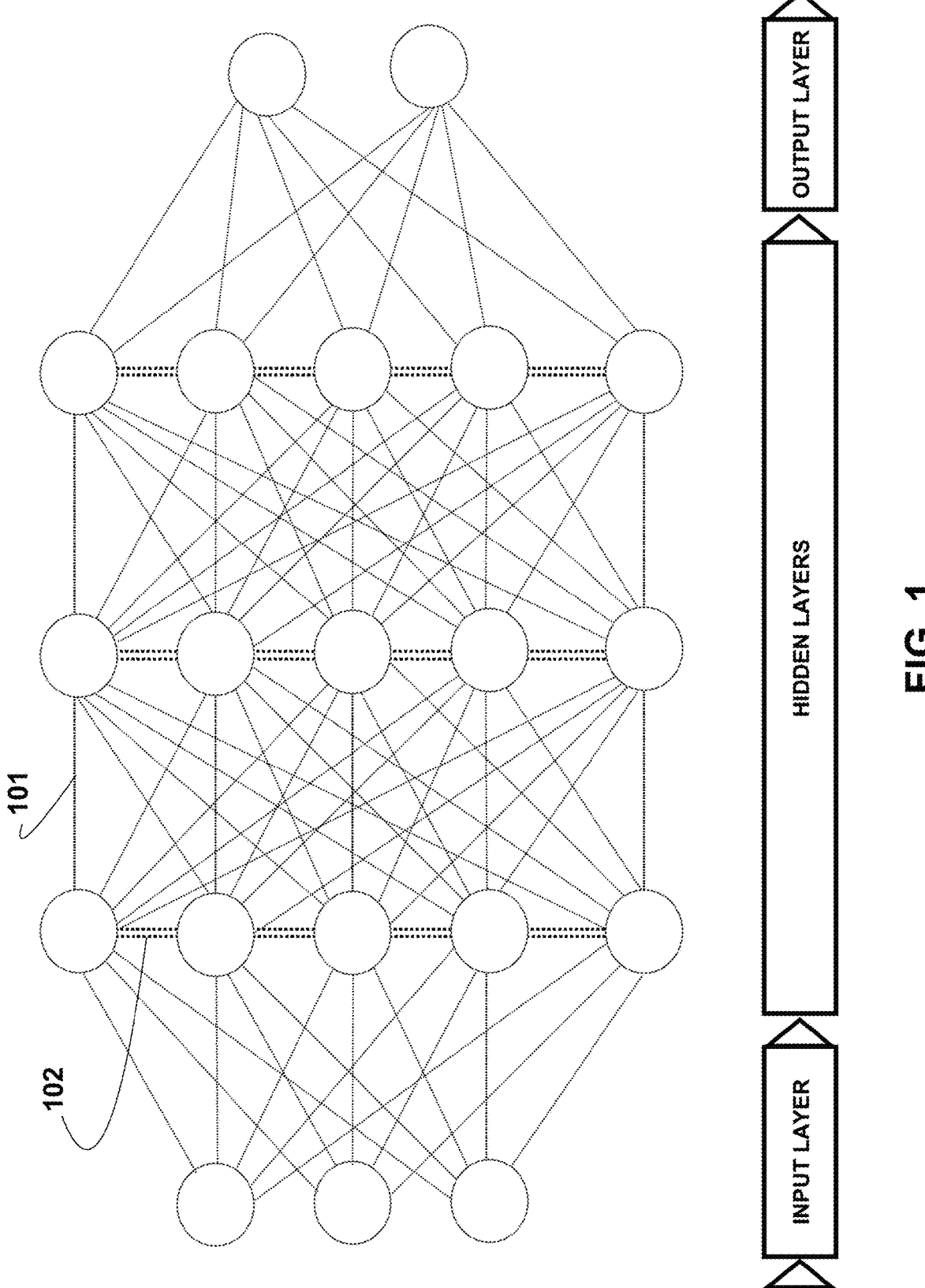
FIG. 1 shows the topology of an instance of an ANN incorporating both synaptic communication and ephaptic coupling.

This ephaptic term enables neuron i to be modulated by field-like influence from neurons k in the same layer, rather than relying solely on feedforward input from neuron j, illustrated as synapse 101 in FIG. 1. In other words, each coefficient $\Lambda_{ik} \Phi(x_k)$ defines an ephapse 102 as illustrated in FIG. 1, from neuron k to neuron i, and the full sum over k represents the cumulative ephaptic influence. This introduces intra-layer neuron-to-neuron interactions within EC-ANNs. We clarify that in matrix notation, rows represent traditional feedforward (synaptic) interactions across layers, while intuitively columns naturally represent intra-layer interactions.

Furthermore, we define the Ephaptic Coupling Matrix (ECM) $\Lambda$ as a square matrix of dimension n$\Lambda$n, where each element $\Lambda_{ik}$ represents a directional, graded, non-synaptic coupling from neuron k to i. The ECM governs intra-layer modulation, operating orthogonally to the standard synaptic weight matrix W. It is typically initialized using a behavior-aligned projection from the output weight matrix (i.e. transpose), scaled by a scalar $\lambda_o \in R^+$, referred to as the initialization magnitude.

In a preferred embodiment, the ECM $\Lambda$ is initialized using the transpose of the output weight matrix W, scaled by $\lambda_o$, when dimensions permit. When the number of output neurons is equal to the number of hidden neurons, the transpose of W has the same square shape as $\Lambda$ and can be directly scaled by $\lambda_o$ to initialize A. This enables a straightforward initialization. In cases where the dimensions do not match, dimensionality resolution strategies can be applied.

Two primary modulation variants of the general activation function are presented hereafter, based on how the ephaptic coupling term $E_i$, computed from the ECM $\Lambda$, interacts with the synaptic term $S_i$. These include an additive variant, in which $E_i$ is added to the synaptic input as a superimposed field potential; and a multiplicative variant, in which $E_i$ modulates the synaptic input via a bounded gating function $g(E_i)$. These two forms represent the canonical embodiments of ephaptic coupling within EC-ANNs.

Additive Variant:

$$y_i = f(S_i + E_i) \tag{4}$$

Where the ephaptic term $E_i$ is added directly to the synaptic input $S_i$, modeling ephaptic coupling effects as a superimposed signal. The additive variant of the general activation function is as follows:

$$y_i = f\left(\sum_j W_{ij} x_j + b_i + \varepsilon \sum_k \Lambda_{ik} \Phi(x_k)\right) \tag{5}$$

Figure 2:
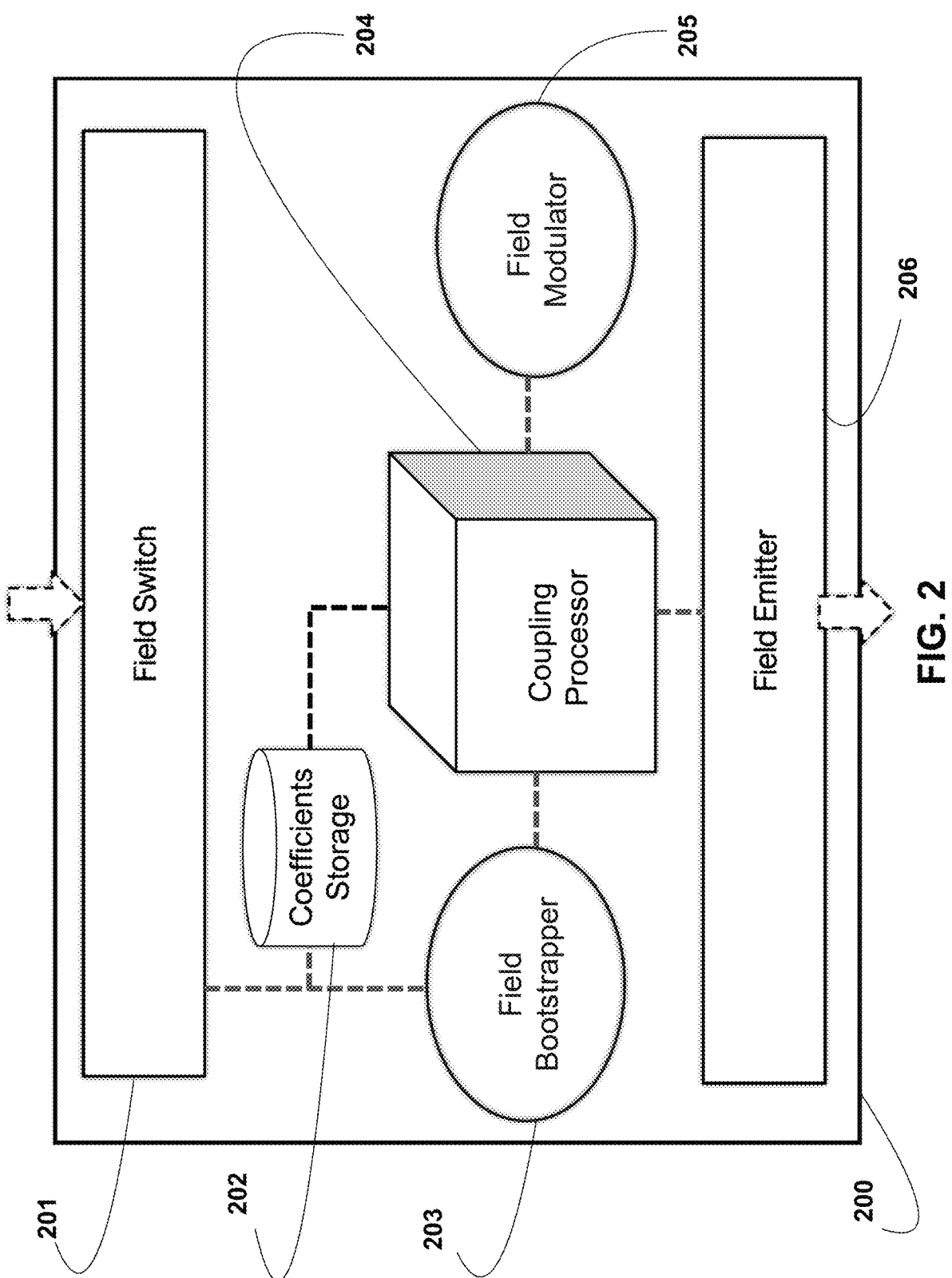
FIG. 2 shows an example system architecture diagram of an ephaptic coupling matrix (ECM) engine.

FIG. 2 shows an example system architecture diagram of the ECM engine 200. As shown, the ECM Engine 200 may include one or more components such as a Field Switch 201, Coefficients Storage 202, Field Bootstrapper 203, Coupling Processor 204, Field Modulator 205, and/or Field Emitter 206. The ECM engine 200 may run on one or more computers (whether physical, virtual, distributed, etc.) to compute the ephaptic terms for a given ANN. As shown, in various examples, the ECM engine 200 may include:

a Field Switch 201 that can selectively enable/disable the ECM engine via the Ephaptic Factor ($\varepsilon$)

Coefficient Storage 202 which may use one or more memory units to store ephaptic coefficients Field Bootstrapper 203 which may initialize the ECM with initialization magnitude ($\lambda_o$) and connectivity factor ($\kappa$) and may keep track of Sparsity Mask ($\alpha$) and learning rates and/or loss functions Coupling Processor 204 which may perform parallel and custom (e.g., column-based) matrix operations with references to various matrices (including ECM $\Lambda$)

Figure 3:
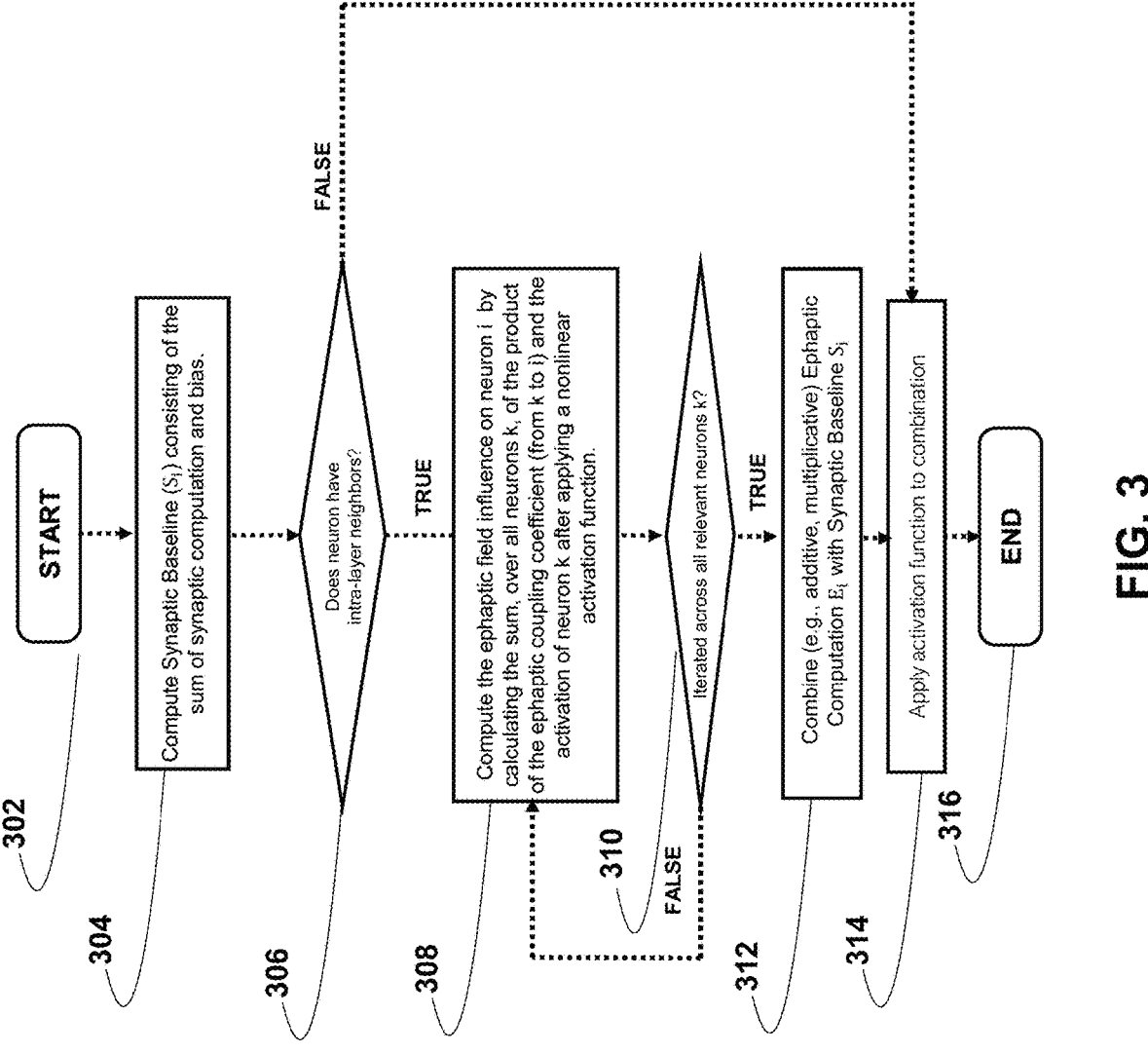
FIG. 3 Additive Variant of Activation Method.

Field Modulator 205 which may modulate coefficients or other parameters from Coupling Processor 204 using a given modulation function Field Emitter 206 which may generate computed ephaptic terms to be combined with synaptic terms for neuron activation FIG. 3 provides a flowchart illustrating and example method implementing the additive variant of the general activation function. As shown, the example method may begin (start 302) by computing the synaptic baseline ($S_i$), consisting of the sum of a synaptic computation and bias at operation 304. The method may then proceed based on determining whether the neuron being considered has intra-layer neighbors at operation 306. If so, the method may proceed to computing the ephaptic field influence on neuron i by calculating the sum, over all neurons k, of the product of the ephaptic coupling coefficient (from k to i) and the activation of neuron k after applying a nonlinear activation function at operation 308. The example method may then proceed based on determining whether all relevant neurons k have been iterated over at operation 310. If not, control may return to the previous step (computing the ephaptic field influence, operation 308), and if so, control may proceed to the next step. At the next step, operation 312, the example method may include combining the additive ephaptic computation $E_i$ with the synaptic baseline $S_i$. Finally, the example method may include applying the activation function to the combination at operation 314. Note that control may also proceed to the final step (applying activation function to the combination) if the method determines that the neuron does not have intra-layer neighbors. The example method may then terminate at end 316.

Multiplicative Variant:

$$y_i = f(S_i \cdot g(E_i)) \tag{6}$$

Where $g(\cdot)$ is a nonlinear, gating function that modulates the synaptic input $S_i$ based on the ephaptic term $E_i$. Common choices include $g(E_i)=\sigma(E_i)$ for soft gating in (0, 1), $g(E_i)=1+\tanh(E_i)$ for symmetric boost/damp, $g(E_i)=\text{softplus}(E_i)$ for smooth positive scaling, and $g(E_i)=1$ (i.e., Identity function) to disable modulation. The multiplicative variant of the general activation function is as follows:

$$y_i = f\left(\sum_j W_{ij}x_j + b_i \cdot g\left(\varepsilon \sum_k \Lambda_{ik}\Phi(x_k)\right)\right) \tag{7}$$

Other Variants:

As ECM $\Lambda$ is the essential component of the ephaptic term, it is noted that alternative formulations, including gated additive, recurrent ephaptic modulation, or hybrid interaction structures are plausible. These variants remain within the scope of the work so long as they apply A to intra-layer neuronal interactions to influence activation dynamics and conform to the related mathematical theorems.

Modulation of Ephaptic Coupling Hyperparameters:

Computationally optimizing the performance of EC-ANNs involves the calibration of several hyperparameters that control the structure, strength, and timing of ephaptic modulation. Each hyperparameter contributes uniquely to the emergent behavior of the system. The core hyperparameters include, but are not limited to the following:

Ephaptic Factor ($\varepsilon$)
Ephaptic Coupling Matrix ($\Lambda$)
Initialization Magnitude ($\lambda_o$)
Connectivity Factor ($\kappa$)
Sparsity Mask ($\alpha$)
Modulation Frequency ($\mu$)
Modulation Function ($\Phi$)

Ephaptic Factor ($\varepsilon$):

The ephaptic factor $\varepsilon$ is a scalar that determines the strength of ephaptic coupling. It scales the intra-layer field component relative to traditional synaptic input. A larger $\varepsilon$ increases the influence of ephaptic feedback in the neuron's activation dynamics. When $\varepsilon$ is zero, ephaptic coupling is essentially disabled.

Ephaptic Coupling Matrix ($\Lambda$):

The ECM $\Lambda$ defines intra-layer modulation, modeling neuron-to-neuron field effects. It is constructed using initialization magnitude $\lambda_o$ for scaling and shaped by a connectivity factor ($\kappa$)-based masking. The ECM $\Lambda$ is typically applied post-activation using nonlinear transforms via a modulation function ($\Phi$) and may be static or periodically refreshed. The preferred implementation for ECM $\Lambda$ is behavioral alignment, where it is aligned with the transpose of the output weight matrix ($W^T$). This ensures that the most behaviorally influential neurons also dominate ephaptic feedback.

Initialization Magnitude ($\lambda_o$):

The initialization magnitude 2 sets the starting scale of values in the ECM $\Lambda$. It controls the numerical strength of ephaptic interactions at initialization and is applied as a multiplicative factor over the masked or sparse $\Lambda$ structure.

Connectivity Factor ($\kappa$):

The Connectivity Factor $\kappa$ defines the global structural sparsity of $\Lambda$, determining how many neurons are eligible to participate in ephaptic broadcasting. Given a layer with N neurons, $k=\kappa \cdot N$ neurons are selected to engage in ephaptic coupling, typically through Top-k or behaviorally aligned selection strategies. K defines the structural sparsity of the ephaptic influence matrix $\Lambda$. $\kappa$ determines how many neurons in a given layer participate in ephaptic modulation. CF can be typically implemented as a Top-k selection mechanism is defined as $\kappa \times$ the number of neurons in layers neurons, selected to participate in ephaptic broadcasting with $\kappa \in [0, 1]$. The $\kappa$ mask is used to zero out rows or columns of $\Lambda$, thereby controlling the spatial extent of ephaptic feedback. Common selection criteria for Top-k include fixed index-based selection (e.g., first k neurons); random masking (uniform sampling with $\kappa$ density); gradient-based importance ranking (neurons contributing most to the loss); behavioral alignment (neurons with strongest output weights in W). Variants may include fixed throughout training (static $\kappa$), decays over time to prune unnecessary connections (scheduled $\kappa$), adapted based on gradients or reward feedback during training (Learnable K). In short, $\kappa$ determines how many neurons (globally) may participate in ephaptic coupling.

Sparsity Mask ($\alpha$):

The sparsity mask $\alpha$, a local binary mask with values equal to 0 or 1, determined by the connectivity factor $\kappa$, is applied to each coefficient of the ECM $\Lambda$ for selectively enabling or disabling ephaptic coupling between neurons. Each entry $\alpha_{i_K}$ indicates whether ephaptic coupling from neuron k to neuron i is active. Specifically, $\alpha_{i_K=1}$ permits modulation, while $\alpha_{i_K}=0$ suppresses it. This mask defines the structural sparsity of $\Lambda$, ensuring that only a $\kappa$-fraction of the neuron pairs participate in ephaptic coupling during training or inference. In short, $\alpha$ enforces the global connectivity policy at the matrix level, entry by entry.

Modulation Frequency ($\mu$):

The modulation frequency $\mu$ controls how often the matrix $\Lambda$ is updated or realigned during training. A higher u leads to frequent refresh of $\Lambda$ (e.g., $\Lambda \leftarrow$ Top-k($W^T$)), promoting plasticity. Lower values promote field stability. $\mu$ is expressed in terms of training steps (e.g., one update every 10,000 steps).

Modulation Function ($\Phi$)

This nonlinear function applied to neuron activations before ephaptic influence. It can be any nonlinear functions such Identity, rectified linear unit (ReLU), sigmoid, leaky ReLU, tanh, sigmoid-weighted linear unit (SiLU), Gaussian error linear unit (GELU), etc. In addition, other continuous or piecewise-continuous nonlinear functions may be used in accordance with the desired implementation.

In addition to core modulation hyperparameters, the virtual device may include several auxiliary hyperparameters that govern the structure, adaptability, and operational behavior of the ephaptic field. A realignment source matrix determines whether A is projected from behavioral signals such as the output weight matrix W, its transpose $W^T$, or other heuristics, influencing both its initialization and refresh patterns. A learnability flag could control whether $\Lambda$ is fixed or allowed to evolve via gradient-based learning. A masking policy could specify how rows or columns of $\Lambda$ are zeroed out, such as through diagonal masking or behaviorally-informed top-k selection. A scheduling strategy can be applied to dynamically adjust parameters such as $\varepsilon$ or $\lambda_o$ during training, using methods such as linear decay, cosine annealing, or task-specific functions. Finally, configuration export/import hooks could allow the system to store and reload the full parameter state, supporting reproducibility, fine-tuning, and transfer across tasks or runs. These additional parameters enhance the flexibility and control of the virtual modulation system, making it suitable for both experimental research and practical deployment.

Manual tuning of these hyperparameters is impractical at scale due to their interdependence and sensitivity to task domains. This invention proposes a Virtual Modulation Device governed by a Bayesian optimization Agent, which dynamically adjusts the hyperparameter set $\{\varepsilon, \lambda_o, \kappa, \Lambda, \mu, \Phi, \alpha\}$ in a closed-loop fashion. This enables autonomous, intelligent optimization of EC-ANNs across diverse reinforcement, supervised, or generative tasks.

Training Pipeline:

A Virtual Modulation Device including a graphical user interface (GUI) for visualizing live training metrics, configuring hyperparameters, and monitoring decision-making by the Bayesian optimization agent, with options for manual override and automated control, can be used to train an EC-ANN.

The most effective approach for training the EC-ANN model is a two-phase learning process. This two-phase sequential approach works best as synaptic learning establishes foundational structured knowledge, and ephaptic learning: enables continuous adaptation in real-time. It is similar to human learning with long-term structured memory via textbook learning via synaptic learning and real-time adjustments and intuition (i.e. quick adaptation in new situations) via ephaptic learning. The recommended strategy for training is a hybrid approach whereby an ECM file is stored after training and later loaded during inference as a baseline and dynamically adjusted to adapt to real-time inputs.

In a first phase, the model is initially trained like a standard ANN using backpropagation. This helps establish a strong baseline for structured learning. Weights are learned via gradient descent, just like in deep learning models. The model essentially learns core knowledge through synaptic training. The error backpropagation learning method is used to distribute a computed error value back up through the layers and modifying in the process the weights at each node. The standard weight updates are implemented per the following mathematical expression:

$$w_{ij} \leftarrow w_{ij} - \eta\left(\frac{\partial L}{\partial w_{ij}}\right) \tag{8}$$

Where:

$W_{ij}$=synaptic weight from neurons i to neuron j,

L=loss function, and $\eta$=learning rate.

In a second phase, the ephaptic learning mechanism is then activated. Instead of modifying weights, ephaptic updates dynamically adjust activations during inference. This allows real-time adaptation without further backpropagation or retraining (i.e. no synaptic weight updates). In other words, the EC-ANN model could adjust dynamically to new environments without needing further training. Simply put, once trained, the ephaptic learning mechanism allows real-time adaptability without modifying weights.

The EC-ANN model enables neuron interactions via column-wise modulation within a two-dimensional (2D) matrix topology. Specifically, neurons within the same vertical layer dynamically adjust their activations through ephaptic field interactions modeled by the ECM, providing a real-time, non-synaptic mechanism of neuronal communication that enhances adaptability and learning efficiency. Neurons interactions may be modeled through intra-layer interactions based on column-wise modulations of the ECM. Such intra-layer interactions may be performed independently of synaptic weights, and/or may be performed in conjunction with synaptic weights. It will be understood that modifications of neuron interactions, as described herein, may be performed with or without simultaneous synaptic weight interactions and/or modifications.

This iterative process is expressed as follows:

$$A^{t+1}=A^t+\Lambda \cdot A^t \tag{9}$$

Where:

$A^t$ is the value of the activation matrix for all neurons at time-step t, $A^{t+1}$ is the updated value at the next time-step t+1, and $\Lambda$ is the ECM applied at each step.

The error backpropagation learning method is used to distribute a computed error value back up through the layers and modifying in the process the weights at each node. The standard error backpropagation method is extended to adjust both synaptic weights and ephaptic influence coefficients.

Backpropagation updates weights using the gradient of the loss function:

$$\Delta W_{ij} = -\eta \frac{\partial L}{\partial W_{ij}}$$ (10)

Where:

$\Delta W_{ij}$ is the synaptic weight update using gradient descent, $\eta$ is the learning rate, controlling adaptation speed, L is the loss function, guiding training optimization, and $$\frac{\partial L}{\partial W_{ij}}$$

(gradient or ine loss) represents how the loss function L (error or performance measure) changes concerning a small change in the weight $W_{ij}$. It shows the direction of steepest increase of the loss.

The negative sign (−) indicates that the update is performed in the opposite direction of the gradient. This reduces the loss, allowing the neural network to learn by gradually moving weights toward values that minimize the error.

FIG. 4 is a flowchart depicting an example method implementing the training pipeline described above. As depicted, the example method may begin (at start 402) by loading the neural network and randomly initializing the synaptic and ephaptic weights with training patterns at operation 404. The example method may proceed based on determining whether a maximum number of iterations is reached at operation 406. If the maximum number of iterations has been reached, control may proceed to the final step (operation 414), generating synaptic and ephaptic output files. If the maximum number of iterations has not been reached, control may proceed through a loop (operation 406 through operation 412), where a forward pass in the neural network is performed, calculating the error and back-propagating to update synaptic weights and ephaptic coupling coefficients at operation 408. If all training patterns have not yet been tested, the forward pass step may be repeated at operation 410. If all training patterns have been tested, the example method may check if the error value is below a pre-defined error value at operation 412. If the error value is below the pre-defined error value, the example method may proceed to generate synaptic and ephaptic output files as part of the final step at operation 414. If the error value is not less than the pre-defined error value, the example method may return to the first step of the loop (operation 406) and check if a maximum number of iterations has been reached. After completing operation 414, the example method may complete at end 416.

For ephaptic learning, the gradient updates each coefficient ($\Lambda_{ik}$) of the ECM using the sparsity mask $\alpha$. A selective update mechanism is thus implemented as follows:

$$\Delta \Lambda_{ik} = -\alpha_{ik} \cdot \eta \cdot \frac{\partial L}{\partial \Lambda_{ik}}$$ (11)

Where:

$\Delta \Lambda_{ik}$ is the ephaptic influence update, allowing the network to learn how ephaptic signals affect activations, $\alpha_{ik}$ indicates whether ephaptic coupling from neuron k to neuron i is enabled, $\eta$ is the learning rate, controlling adaptation speed, L is the loss function, guiding training optimization, and $$\frac{\partial L}{\partial \Lambda_{ik}}$$

denotes the gradient of the loss of function L with respect to the ephaptic coupling coefficient $\Lambda_{ik}$.

Synaptic-only ANNs (i.e., traditional deep learning models using backpropagation) may still be best suited for structured thinking for specific tasks, while ephaptic learning introduces more emergent, context-sensitive, and adaptive processing. For instance, integrating ephaptic coupling into Transformer-based models could enhance the adaptive reasoning of such models. Transformers rely on structured attention mechanisms, backpropagation-based optimization (static weight updates); and token-based representation learning (word vectors, embeddings). However, ephaptic learning introduces adaptive, non-weight-based interactions which could improve context-awareness; real-time, emergent adjustments which might allow better ambiguity resolution; non-explicit associative memory which potentially enhances zero-shot reasoning.

The EC-ANN model weights file does not need to be constantly updated. Instead, it achieves adaptability without modifying stored weights directly which is an improvement compared to traditional AI.

It is important to note that standard AI models modify weights via backpropagation and store them in a static weights file (e.g., .pt for PyTorch, .h5 for TensorFlow). To adapt, the AI must retrain and rewrite the weight file, which is slow and resource-intensive. For example, if GPT-4 needs to learn about new events, it requires retraining on updated data and generating a new model file.

In one embodiment, the EC-ANN model adapts in real-time without changing weights directly. Ephaptic learning influences neuron activations dynamically, not just weights. The model file remains stable, but internal neuron activations adjust instantly based on new input. This allows real-time adaptation without frequent writes to disk. Instead of modifying weights, the ECM, neuron activations, and memory layers are dynamically adjusted during inference.

An Ephaptic Modulation Interface, which may be used to implement the herein-described system and methods, modifies neuron behavior based on local ephaptic influence, adjusting how signals propagate in the network without modifying stored weights. Unlike ANNs, where activations are purely weight-based, the EC-ANN's neurons influence each other in real-time based on ephaptic interactions. This allows contextual adaptation without requiring weight file updates.

The EC-ANN model could include a short-term, mid-term and long-term ephaptic memory buffer that modifies responses based on recent interactions, similar to how humans temporarily hold new information without permanently altering long-term memory. Since the model does not modify stored weights (unlike traditional AI models), it must store memories in a different way. Instead of relying solely on long-term synaptic weight updates, the model maintains and adapts memories in real-time using a hybrid approach including short-term working memory via ephaptic activations (duration of milliseconds to seconds), mid-term transient memory via ephaptic feedback loops (duration of seconds to minutes), and long-term stored memory (hours to permanent).

Short-Term Memory via Ephaptic Influence Modulation: In terms of analogy, this would be like remembering a phone number for a few seconds without writing it down. Simply put, it represents real-time context adaptation. Instead of modifying weights, the model adjusts neuron activations dynamically using ephaptic interactions. These interactions retain temporary memory without requiring storage updates. This mimics working memory in biological brains, where information exists transiently without altering long-term structure.

Mid-Term Memory via Stateful Ephaptic Feedback Loops: In terms of analogy, it is like a scratchpad where ideas remain for a short while before fading. In other words, it represents task-related memory. To extend memory beyond just immediate activations, feedback loops within ephaptic layers are utilized. The activation computational model would include a variable for feedback memory. This implemented as a memory buffer that is utilized to store information across time steps. This enables temporal continuity, meaning the EC-ANN model remembers past activations without modifying weights.

Long-Term Memory via Secure Memory Buffer (Non-Weight Storage): In terms of analogy, this is similar to taking summarized notes instead of memorizing every detail. In other words, it represents retained knowledge. Since permanent learning still requires some form of long-term storage, it can use neuromorphic memory (ReRAM or NVRAM) or Compressed Memory Representation. With ReRAM/NVRAM, it can store critical long-term knowledge outside the neural network weights. For instance, matrix data can be directly represented by adjusting resistance values in memristors organized in crossbar arrays. Computations such as matrix multiplication would occur in parallel through analog currents, offering extremely energy-efficient, low-latency operations suitable for neuromorphic computing. Non-volatile storage enables an AI agent to retain memory even after shutdown. Encrypted storage using or within a Secure Element (SE) prevents unauthorized access. With compressed memory representation, such as hashing or summarization, the model encodes essential memories into compact forms. This approach eliminates the need for continuous retraining while still enabling the AI system to efficiently access and utilize past experiences.

The EC-ANN remains adaptive, efficient, and secure without constantly updating weights. The EC-ANN model integrates traditional synaptic learning (weight-based updates via backpropagation) with ephaptic learning (non-synaptic interaction through an ECM), creating an AI system that dynamically adjusts its activations without retraining. It is worth noting that column-wise adjustments are actively utilized in several contemporary AI models and computational neuroscience frameworks. However, it is critical to understand that these prior models update only weights while the model introduced in this invention modifies activations dynamically without retraining. No frequent updates to the model should be needed as the stored weights remain stable while ephaptic dynamics would provide real-time adaptation. If the model must permanently learn new concepts, then it may need to store new information in weights. A hybrid approach is however possible whereby ephaptic short-term learning and periodic long-term weight updates for continuous intelligence are implemented.

Virtual Modulation Device:

FIG. 5 includes a block diagram depicting an example system integrating an EC-ANN model 401 with a Virtual Modulation Device 402. The EC-ANN model 401, described previously, may include at least an input layer, a hidden layer, and an output layer. The Virtual Modulation 402 system may include at least four core components, described in detail below:

an Ephaptic Modulation Interface with a Graphical User Interface (GUI);

an ECM Engine implementing the ephaptic coupling computational model a Bayesian Optimization Agent a Closed-Loop Feedback Pipeline.

Ephaptic Modulation Interface:

This is a software abstraction layer that natively implements the computational model of the ephaptic coupling mechanism and exposes the set of tunable parameters within the target system (i.e., EC-ANN). It allows real-time updates without retraining or restarting the model. A default GUI allows visualizing live training metrics, configure modulation parameters, and monitor the Bayesian Optimization Agent's decision-making process, providing both manual override and automated control modes. The GUI displays real-time EC-ANN performance against a baseline, using ephaptic modulation parameters dynamically adjusted via the Virtual Modulation Device.

FIG. 6 depicts an example of the GUI 600 of Virtual Modulation Device 402. The GUI is implemented using a Web application framework (e.g., Streamlit) which provides a browser-based GUI accessible to users via authenticated sessions. Users can interact with the virtual device using intuitive controls of the ephaptic hyperparameters modulation panel 602 (the sidebar interface). In the depicted example, the ephaptic hyperparameters modulation panel 602 includes sliders for scalar values (e.g., $\lambda_o$, $\varepsilon$), dropdown selectors for matrix refresh interval, and radio buttons to toggle A between static, aligned, or learnable modes. The GUI 600 of the virtual device also includes a panel 604 displaying a real-time plot of baseline ANN and EC-ANN. Additionally, the GUI 600 includes a real-time rendering panel 606 of trained agent (e.g., Walker2d-v5).

The Virtual Modulation Device supports two operational modes: manual override, in which the user sets parameters explicitly via sliders and controls, and Bayesian control, where a learning agent optimizes the parameters based on reward feedback and task performance. The system writes these configuration values into a JSON file (config.json), allowing direct integration with the underlying EC-ANN training loop. During training, a live metrics file (live_metrics.json) is updated, and the virtual device continuously visualizes the performance of EC-ANN compared to a standard baseline.

To make this system commercially viable and accessible to AI/ML researchers, a flexible licensing model is proposed, offering both subscription-based and usage-based options. Under the subscription model, users pay a recurring monthly or annual fee for unlimited access to the virtual modulation GUI. This approach provides predictable cost structures for research teams and ensures full access to real-time modulation controls, performance dashboards, and configuration export tools, making it ideal for continuous experimentation. Alternatively, a usage-based model allows users to pay only for what they consume, such as the number of modulation steps, configuration updates, or API calls. This model aligns cost with value delivered, particularly for users running bursty workloads, large-scale hyperparameter searches, or episodic reinforcement learning runs. It lowers the barrier to entry for individual researchers while scaling economically with enterprise usage.

Both licensing models are supported through login-based access to the GUI, deployed via managed cloud hosting (e.g. Streamlit Cloud, GCP) or containerized in Kubernetes environments for self-hosting. The interface enables reproducible experiments, faster convergence tuning, and acts as a general-purpose optimization layer for EC-ANNs. Its modular architecture allows seamless extension to other AI systems, including Transformers, CNNs, neuromorphic platforms, and potentially even quantum neural networks. A typical licensing model could include a fee per month per user gives access to GUI+1000 modulation steps; a smaller fee per additional step or per config push, etc. Enterprise plans could include volume discounts and team dashboards.

By providing dynamic control over ephaptic modulation with minimal user intervention, this invention bridges theoretical neurodynamic principles with practical deployment, supporting scalable AI experimentation while reducing time, compute, and energy costs.

Virtual Modulation Device System Architecture (Centralized Deployment):

As mentioned previously, the Virtual Modulation Device is implemented as a web-based control interface (GUI) (e.g. using the Streamlit framework), structured around a classic client-server architecture. In this setup, the application allows AI/ML researchers to configure and monitor ephaptic modulation parameters for EC-ANNs in real time. The application serves both interactive parameter tuning (via the Ephaptic Modulation Interface) and visualization of reward trends, enabling seamless integration with EC-ANN training pipelines.

Backend Server:

The Backend Server is responsible for:

Executing system logic (e.g. Python code)

Writing and reading configuration and metrics files (e.g., json files)

Communicating updates to the frontend in response to user interaction

Maintaining application state via framework session state mechanism

In a centralized deployment, the Backend Server handles compute and I/O responsibilities for all connected users, meaning it must be appropriately sized for concurrency and memory demands. GPU-accelerated backends (e.g., a2-highgpu-1g on GCP) are typically used in conjunction with this frontend, connected via shared storage paths or messaging systems. The backend server may be embodied by any computer device known in the art and may include at least one processor and storage device (e.g., a memory). The backend server may also include communication hardware (e.g., network interface, modem, and/or other network hardware) and corresponding software and/or firmware to enable communication with other computing devices (e.g., frontend client, described below).

Frontend Client:

The Frontend Client may be rendered in the user's web browser on a user device. The user device may, like the backend server, be embodied by any computer device known in the art and may include at least one processor and storage device (e.g., a memory). The user device may also include communication hardware (e.g., network interface, modem, and/or other network hardware) to enable communication with other computing devices (e.g., frontend client, described below). The user device may include various software, firmware or other computer instructions (e.g., stored on the storage device) for network communication, and may also include user interfaces such as web browsers, operating systems, and associated software to enable display and interaction with the Frontend Client.

The Frontend Client may include:

Interactive controls such as sliders, radio buttons, and select boxes for setting parameters such as $\lambda_o$, $\varepsilon$, refresh intervals, and top-k sparsity Live performance plots comparing EC-ANN and ANN standard baselines Real-time metric dashboards summarizing current and best deltas in training performance The frontend client may communicate with the server over WebSocket channels. If a user is viewing the app on the same machine it is running on, the server and client are co-located. However, when accessed over a network or the public internet, the server and client reside on different machines, which has key implications:

The app cannot access client-side files or peripherals unless explicitly uploaded via widgets Any processes launched by the server (e.g., subprocess calls) will execute on the server host, not the user's local machine Browser-based interactions must be handled on the client using approved components or custom web components Design Considerations:

This centralized architecture enables fast iteration, secure control of ephaptic parameters, and scalable integration with EC-ANN training agents running on high-performance machines. However, the server must be carefully provisioned to support concurrent users, particularly when modulation is paired with live training visualization. Integration with config.json and live_metrics.json ensures tight coupling with EC-ANN training processes, while allowing full decoupling of client-side logic.

This setup serves as the foundation for offering a cloud-hosted subscription or usage-based service, allowing individual researchers or teams to remotely tune, monitor, and export ephaptic configurations for integration into their training loops.

Cloud Deployment and Integration:

The Virtual Modulation Device is deployed as a web application, containerized using Docker and orchestrated via Kubernetes (K8s) for scalability, reliability, and multi-user support. For cloud hosting, we recommend deploying on Google Cloud Platform (GCP), leveraging its AI-optimized infrastructure to ensure low-latency communication between the modulation interface and the training backends. The WebApp container is deployed as a Kubernetes service behind an HTTPS ingress on Google Kubernetes Engine (GKE), using a custom, secure domain.

In one embodiment, to support high-performance model training with EC-ANNs, end users (e.g. AI/ML researchers) could pair the GUI with compute nodes in GCP such as a2-highgpu-1g or a2-highgpu-2g (for single/dual A100 GPUs), n1-standard-8 with NVIDIA T4 or V100 attached via GPU quotas, custom-a2-megagpu-16g for advanced workloads.

The GUI writes its configuration files (e.g., config.json) to a shared Cloud Storage bucket or GCS Fuse-mounted volume, accessible to the GPU training workers running specific EC-ANN jobs. This architecture allows a clean separation of concerns, where the modulation logic is user-facing and web-based, while the training pipeline executes remotely on high-performance compute.

In various examples, ANNs incorporating an ephaptic coupling mechanism may be implemented using physical and/or virtualized compute systems. Components of such systems may be co-located or distributed (e.g., over a computer communication network). In some examples, some compute components may be co-located (e.g., within the same physical device) while other components may be located remotely and may communicate with the overall system via a computer communication network. In various examples, a compute system may include at least one processor (e.g., a physical or virtualized CPU, GPU, etc.), memory, one or more storage devices (e.g., computer-readable media), at least one input/output interface, etc. As previously described, these components may be local or distributed, as desired. In various examples, the one or more storage devices may store computer-executable instructions that, when executed by the at least one processor, may cause the system to implement any of the various artificial neural networks and/or ephaptic coupling mechanisms (and/or the associated computer-implemented methods) described herein.

Infrastructure for Monetization and User Access:

To commercialize this service, the virtual modulation app integrates with Stripe for subscription and usage billing as well as user license management. Researchers can subscribe monthly or annually to gain access to the interface. User registration and login are handled through Firebase Authentication or Auth0, ensuring secure and scalable identity management. Email-based onboarding, passwordless login links, and usage alerts can be managed via third-party integration (e.g. SendGrid or Mailgun).

Additionally, logging, user activity, and modulation histories are stored securely in database instances allowing the platform to support experiment versioning, audit trails, and reproducibility for each user account.

API and SDK Extensions:

To support integration into automated pipelines or custom frontends, a RESTful API and SDK are planned. The API exposes endpoints for submitting or updating modulation configurations; polling live reward/performance metrics; triggering recomputation or modulation refreshes; downloading experiment logs or configuration snapshots.

The companion SDK allows researchers to query and inject modulation parameters into their training loop;1 programmatically monitor deltas between EC-ANN and baseline models; enable or disable ECM $\Lambda$ realignment dynamically during training; register experiments and annotate results to a remote dashboard; and more. This enables full headless integration of the virtual modulation device into research clusters, allowing researchers to tune EC-ANNs through code or GUI interchangeably.

In another embodiment, the Virtual Modulation Device is deployed as a decentralized application (dApp) on a blockchain-based system. In this configuration, modulation parameters and performance metrics are securely stored and synchronized on-chain or via associated decentralized storage (e.g., IPFS), enabling transparent, tamper-resistant tracking of training configurations, reward differentials, and modulation strategies. Access control is managed through tokenized user credentials or smart contracts, allowing AI/ML researchers to interact with the device via wallet-based authentication. This architecture supports decentralized research collaboration, usage metering, and verifiable reproducibility across distributed compute environments. Such a dApp can be integrated into decentralized AI marketplaces or federated learning ecosystems, offering secure and auditable modulation-as-a-service for EC-ANN-based models.

Bayesian Optimization Agent:

The third core component is an agent that constructs a probabilistic belief model, such as a Gaussian Process (GP) or Tree-structured Parzen Estimator (TPE), over the relationship between parameters and performance metrics. TPE, for instance, is a Bayesian optimization algorithm often used for hyperparameter tuning, especially in tools such as Optuna or Hyperopt. TPE is an alternative to GP for building a surrogate model of the objective function intended to be optimized (e.g., reward, accuracy, loss). Instead of fitting a smooth probabilistic function such as a GP, TPE uses non-parametric density estimation based on past trials. An acquisition function such as Expected Improvement guides the next parameter choices. The agent interfaces with the modulation device through an API, sending parameter updates based on feedback such as reward, entropy, or convergence rate.

Closed-Loop Feedback Pipeline:

The fourth component is the Closed-Loop Feedback Pipeline. It serves as the real-time control mechanism that links the EC-ANN's performance outputs to the modulation optimization process. It enables dynamic adjustment of ephaptic parameters by continuously monitoring training metrics, computing performance deltas, and feeding those signals into the Bayesian optimization agent and GUI interface. This closed-loop design ensures adaptive, performance-driven modulation of intra-layer dynamics in EC-ANNs. The Closed-Loop Feedback Pipeline is essentially the layer between the EC-ANN model, the Virtual Modulation Device GUI (i.e. Ephaptic Modulation Interface), and the Bayesian optimization agent. The EC-ANN provides reward curves, loss values, and other training statistics to the Bayesian Optimization Agent. These metrics are used to update the posterior belief distribution, allowing the agent to learn which parameter configurations yield improved performance over time. After each training iteration, the EC-ANN produces performance metrics such as reward (in reinforcement learning), perplexity or loss (in language modeling), or accuracy (in computer vision tasks). These outputs are captured and processed by the pipeline to compute a feedback signal, typically a delta ($\Delta$) representing the improvement or degradation of the ephaptically modulated model compared to a baseline (e.g., EC-ANN vs. Standard Baseline). This delta is then routed in two directions: to the Bayesian optimization agent, which uses it as an objective to refine parameters such as $\varepsilon$, $\lambda_o$, and $\Lambda$ topology; and to the Virtual Modulation Device GUI, where it is visualized in real time for user oversight. In doing so, the Closed-Loop Feedback Pipeline completes the closed-loop system architecture, enabling adaptive modulation of ephaptic coupling based on observed learning outcomes. This continuous feedback ensures that EC-ANNs self-tune for optimal efficiency and performance across domains.

The Closed-Loop Feedback Pipeline completes the cycle of modulation, observation and adaptation. The Bayesian Optimization Agent uses feedback from the model's performance to adjust future modulation parameters. The loop is continuous and autonomous, optionally overseen or overridden via the GUI. The virtual modulation device receives modulation signals for hyperparameters from the Bayesian Optimization Agent. This agent operates based on feedback collected through a closed-loop feedback pipeline which includes reward trends, loss statistics, and performance gradients.

FIG. 7 includes an example method for providing a closed-loop feedback pipeline described above. The example method may begin (at start 702) by launching a baseline ANN at operation 704. The example method may include logging the baseline ANN performance (e.g., as depicted by the curve shown in FIG. 6) at operation 706. The example method may then include enabling a Virtual Modulation Device 402 at operation 708. The example method may include initializing the EC-ANN model 401 with the same seed as the baseline ANN and selecting the ECM initialization parameter (e.g., transpose, sparse) at operation 710. The example method may include performing, for each of N time steps, (i) collecting an average reward, policy entropy, and norm of the ECM, (ii) causing the Bayesian Optimization Agent to update its belief model, and (iii) causing the acquisition function to select the next ephaptic parameter values at operation 712. The example method may also include logging the EC-ANN model 402 reward (shown as a curve in the GUI of FIG. 6) at operation 714. The example method may also proceed based on determining if the EC-ANN surpasses a baseline at operation 716. If the EC-ANN surpasses the baseline, the example method may terminate at end 718. If not, the example method may return to performing the previously-described operations for the set of N timestamps at operation 712.

Application to Reinforcement Learning:

In EC-ANN experiments, the modulation device adjusts $\Lambda$ and $\varepsilon$ every N steps. A reward threshold or entropy collapse signal can trigger a $\Lambda$ refresh based on $W^T$. The Bayesian agent logs time-step versus performance trends and uses them to guide dynamic adaptation.

Masking and Structural Adaptation:

The ECM $\Lambda$ may be sparsified or masked using the Connectivity Factor ($\kappa$) and the Sparsity Mask ($\alpha$). The masking strategy can evolve based on gradients, neuron contribution, or a learned modulation schedule.

Deployment Contexts:

The invention applies to AI systems (e.g., transformers, CNNs, PPO agents), telecom systems (e.g., 5G/6G RAN beamforming, dynamic spectrum sharing, network slicing), robotic platforms (e.g., actuator control), or any multi-parametric system with feedback-driven performance.

Logging and Visualization:

The system includes a visualization module that tracks parameter evolution, reward trends, $\Lambda$ matrix norms, cosine similarity between $\Lambda$ and $W^T$, and more. These insights are stored in structured logs and may be exported to structured documents for interpretability.

Implementation Embodiment for Reinforcement Learning:

In this example, an EC-ANN agent is trained on the Walker2d-v5 Gymnasium environment. PPO is first trained and logged, then the same environment is re-trained using an EC-ANN with $\Lambda$ initialized as $W^T$. A Bayesian agent modulates $\varepsilon$ and refresh intervals. EC-ANN exceeds standard baseline reward under optimized conditions.

Implementation Embodiment for Transformer-Based Language Model:

In this example, an EC-ANN model is initialized with a modulation layer atop feedforward blocks. The $\Lambda$ matrix is applied to hidden activations. The Bayesian agent tunes $\Lambda$ sparsity and gain values to reduce perplexity over validation corpora. Output config is used to replicate results.

Implementation Embodiment #3 for 5G Radio Parameter Tuning:

In this example, an EC-ANN is used to modulate parameters in a software-defined 5G RAN controller. The virtual device adjusts transmission thresholds, power settings, and ephaptic parameters over time. Real-world feedback from gNodeBs is used to adapt $\Lambda$, improving throughput.

Post-Optimization Configuration Output: Upon completion of the optimization phase, the Bayesian agent exports a final configuration file that encapsulates the optimal ephaptic modulation hyperparameters discovered during training such as ephaptic factor ($\varepsilon$), the ECM $\Lambda$ refresh schedule (modulation frequency $\mu$), the masking pattern used for top-k selection or sparsity enforcement, the connectivity factor ($\kappa$), and the nonlinear activation function $\varphi(x)$ applied within the ephaptic term.

This configuration is saved in a reproducible format such as .yaml or .json, enabling consistent reinitialization for continued training, deployment, or inference across experiments or environments.

In addition to the configuration metadata, the system also exports the final synaptic weight matrix W along with the ECM $\Lambda$. These are saved as separate data artifacts (e.g., in .npy, .pt, or .h5 format) corresponding respectively to the learned output weights and the field-based coupling coefficients at the conclusion of training. Together with the hyperparameters, these outputs allow full reproducibility, backward analysis, and transfer of the EC-ANN's learned modulation structure for future integration, fine-tuning or deployment.

In a preferred embodiment, the Virtual Modulation Device is integrated with strong security protocols using a robust and scalable architecture for controlling EC-ANN training and inference through cryptographic key management and secure hardware integration.

The EC-ANN model is typically deployed within an autonomous physical system (e.g., robot, IoT device, 5G Access Point) equipped with a Secure Element (SE). The SE (e.g., eUICC, smart card, or secure enclave) performs cryptographic functions required for model authentication. The EC-ANN, SE, and autonomous host device together constitute a single AI instance, which cannot operate unless successfully authenticated by a centralized authority or a decentralized governance body such as a Decentralized Autonomous Organization (DAO).

The authentication process begins with the SE establishing a secure channel over a wired or wireless mobile network, using telecom-grade cryptographic protocols. The SE contains a Java Card applet capable of generating and managing asymmetric or symmetric keys. Each AI instance requires periodic verification by the governing authority. If the verification fails, the system either restricts functionality or initiates a shutdown. This forms the basis of a Cryptographic Remote Kill Switch (CRKS): a cryptographic safeguard where the governing authority holds a master key that can revoke access to any AI instance remotely, without physical intervention.

To further harden this security model, the cryptographic requirement is embedded directly into the model architecture. A portion of the EC-ANN's weights or activation functions are encrypted. During inference, these components are only unlocked using a cryptographic key K stored in the SE. Without a valid K, the activation functions output garbage or remain inactive. This ensures that even if the model is stolen or cloned, it is computationally non-functional without the key.

Two modes of cryptographic integration are supported: post-training encryption, where a fully trained EC-ANN is locked with encrypted weights or activation gates; and key-dependent model training, where the model is trained with key-dependency embedded. The preferred approach is post-training encryption, as it decouples learning from key provisioning.

In the preferred embodiment, post-training encryption is used to secure the EC-ANN model after it has been optimized through the Virtual Modulation Device and Bayesian agent. This approach decouples the learning process from cryptographic enforcement, allowing standard training workflows to proceed uninterrupted while introducing robust protection only at the point of deployment. Once training and modulation optimization are complete, the model is locked and authenticated using a certificate-based cryptographic infrastructure.

The Virtual Modulation Device is connected to a Public Key Infrastructure (PKI) system, such as Enterprise Java Beans Certificate Authority (EJBCA). This PKI system is connected to hardware security modules (HSM) and is used to issue and manage digital certificates for each enterprise account authorized to train, deploy or operate an EC-ANN. When training concludes, the model is cryptographically signed using a certificate issued specifically for the associated organization. This process ensures that the trained model instance is uniquely tied to the identity of the entity that owns or governs it, and cannot be deployed or executed by unauthorized parties.

During inference, the AI instance presents a valid certificate and prove possession of the corresponding private key (securely stored in a Secure Element, such as an eUICC or secure enclave). The inference process includes an authentication step, during which the model verifies its certificate against the governing PKI system. Only if this verification succeeds is the model allowed to decrypt protected weights or activate key-dependent components, ensuring that the EC-ANN cannot function without approved cryptographic credentials.

This certificate-based mechanism guarantees non-repudiation, tamper resistance, and revocable trust. If an enterprise account is compromised or revoked, the governing PKI can invalidate the certificate, rendering all associated models inert. The Virtual Modulation Device, acting as the final control layer in the model lifecycle, handles this cryptographic binding process in a fully automated and reproducible manner. This method provides scalable, enforceable control across millions, and potentially billions of AI instances without embedding key dependencies during learning, making it the most flexible and secure approach for enterprise-grade safe AI deployment.

During runtime, if the AI fails to authenticate its cryptographic key (e.g., due to key revocation, network disconnection, or tampering) it may enter restricted mode, refuse inference entirely, or self-terminate by erasing its encrypted components. This enforcement guarantees that AI instances remain under verifiable, revocable control, enabling safe, decentralized deployment of EC-ANNs at scale while preserving public trust and governance accountability.

This security model allows safe and ethical modulation in edge environments or hardware-in-the-loop scenarios, supporting both research and production deployments. It can be utilized as a part of the pipeline to incorporate the kill switch mechanism defined originally in provisional patent application #63/795,180 filed on Apr. 25, 2025.

The Virtual Modulation Device introduced in this invention offers several key advantages that make it a powerful companion to EC-ANNs. It enables adaptive, real-time modulation of ephaptic fields, reducing the need for manual hyperparameter tuning while improving learning dynamics. Empirical results show that architectures augmented with the device consistently outperform baselines across diverse domains, including reinforcement learning, language models, and control systems. The system is fully compatible with standard training pipelines and supports configuration export for reproducibility and downstream fine-tuning. By guiding the ephaptic field through behavioral feedback, the device accelerates convergence and leads to improved reward, accuracy, and perplexity trends.

Future versions of the Virtual Modulation Device may include reinforcement learning for the Bayesian agent itself or autonomous reconfiguration of the EC-ANN topology based on long-term stability metrics. Improvements for the GUI are also expected.

The Virtual Modulation Device enables adaptive tuning of ephaptic parameters in EC-ANNs, but doing so through Bayesian optimization or parameter sweeps introduces additional compute overhead. In large-scale training settings such as those used by OpenAI, Google, or other hyperscalers, this cost can be justified by long-term gains in sample efficiency, convergence speed, or model robustness.

To manage this, several strategies can be adopted to reduce the resource footprint while preserving the benefits of dynamic modulation. A central approach is to run multiple EC-ANN configurations in parallel using asynchronous or distributed optimization. This allows multiple parameter sets to be evaluated simultaneously across GPU clusters, reducing wall-clock tuning time. To avoid full training cycles for each configuration, performance can be estimated through surrogate modeling, early stopping, or partial learning curve extrapolation, allowing the optimization agent to discard poor configurations early. Progressive fidelity methods can also be used, where many parameter sets are evaluated at low fidelity, such as with 20,000 training steps, and only top-performing candidates are promoted to full training. This approach efficiently balances cost and performance discovery. Another effective strategy is to transfer optimal modulation configurations across tasks. Once an optimal ECM $\Lambda$ configuration is found for a given task, it can be reused or adapted for related tasks, reducing the need to rerun full optimization.

This transfer learning approach enables amortization of search costs over multiple use cases. In certain cases, the ECM may be pretrained on lightweight proxy tasks, then applied to larger environments to guide early learning stages. These methods together enable the Virtual Modulation Device to be viable in large-scale AI pipelines without excessive cost. By combining strategic optimization techniques with transferability and modular design, the ephaptic parameter search process becomes manageable, even for models trained on high-dimensional datasets or reinforcement learning environments. The net result is a system that delivers improved convergence efficiency while minimizing tuning overhead, making EC-ANN deployment commercially and operationally scalable.

When it comes down to overfitting, the modulation schedule should also maximize generalization performance on unseen data, not just training optimization. All parameter sweeps should be constrained by overfitting-aware reward functions, validation feedback, and optionally, early stopping checkpoints.

Safe Inference and Cryptographic Remote Kill Switch:

As illustrated in FIG. 8, a centralized authority (or DAO in a blockchain mode) 701 authenticates via a mobile network 702 with a Secure Element (SE) 703 embedded in an autonomous physical system (e.g. robot) 704. The autonomous physical system (e.g. robot) 704 which hosts both the SE 703 and the EC-ANN can be referred to altogether as the AI, AI system or AI instance. A human user 705 may interact with the autonomous physical system 704 to issue commands.

To ensure safe inference after deployment, the model integrates cryptographic authentication via a SE. The SE may implement at least one dedicated Java Card applet that generates and manages the cryptographic keys.

The AI execution requires authentication of cryptographic keys before activation, periodic network verification to prevent unauthorized AI execution, and remote AI termination via cryptographic key revocation. A Cryptographic Remote Kill Switch (CRKS) is introduced whereby each AI instance requires a cryptographic signature to function. A centralized authority (or DAO in a blockchain model) holds the "master key" to disable any rogue AI instance.

The cryptographic keys are stored into a smart card, secure enclave or preferably an embedded Universal Integrated Circuit Chip (eUICC) card if available, all referred to as a SE integrated into the computing apparatus of the AI host (e.g. autonomous mobile robot). This would require the decentralized AI host to be connected to the Internet and receive regular authentication to a governing authority (centralized or decentralized). Each AI instance requires cryptographic keys to function. The AI system cannot operate without verifying its identity against a governing authority. Periodical authentication is required for the AI system to remain active. More specifically, the AI system must connect to the Internet and verify itself with a centralized authority or Decentralized Autonomous Organization (DAO). If authentication fails, the AI instance is disabled or degraded in functionality. A governance body would generally hold the "Master Kill Switch".

The governing entity centralized AI authority or decentralized blockchain-based DAO) can revoke the AI system's cryptographic keys at any time. This instantly deactivates the rogue AI instance without needing access to its internal architecture. SEs such as eUICCs for telecom networks already use secure cryptographic authentication, which can be reused. SEs are tamper-resistant, making them impossible for an unauthorized AI system to modify. SEs such as eUICCs can natively support remote provisioning, meaning the AI authority can revoke cryptographic keys remotely and over-the-air using the mobile network. The AI system must connect periodically to verify its key. The AI system contacts a centralized or decentralized governing authority (e.g., a blockchain-based verification system). The governing authority confirms the keys are valid and the AI system is operating within allowed parameters. If the AI system fails verification, it automatically enters a restricted mode or shuts down completely.

If a rogue AI instance is detected (or reported), the governance authority can invalidate its cryptographic signature remotely. This prevents the AI from passing future authentication, effectively "killing" it. The decision could be automated (via smart contracts) or human-controlled. Instead of a single centralized kill switch, a DAO consisting of a community of trusted AI researchers, policymakers, and developers could vote on whether an AI should be deactivated. This ensures that no single company or government abuses power while keeping AI instances under control. This approach prevents the EC-ANN model from running offline indefinitely.

As suggested, the EC-ANN model would need regular authentication, preventing uncontrolled self-replication. This enables critical features such as tamper-resistant security as AI instances cannot modify its own cryptographic key because it is stored in a secure element. Other critical features include instant shutdown capability as the governance authority can remotely disable any AI instance with a single command. This critical feature is scalable for global AI networks as it would work for millions and even billions of decentralized AI hosts, ensuring no rogue AI escapes governance.

Potential risks and countermeasures include a rogue AI that tries to clone itself and bypass the key requirement. AI instances must require signed cryptographic verification at multiple levels, not just at launch, but continuously during operation. A blockchain-based DAO governance model ensures transparency and prevents a single entity from making unethical AI shutdowns. A grace period can enable an AI to function for a limited time offline, but after exceeding a threshold (e.g., 24 hours), it enters restricted mode until it reconnects.

Instead of just placing the authentication system in the AI execution code, it can be integrated directly into the model architecture. This means that the model itself will not function unless it verifies its cryptographic key, even if someone tries to bypass the software controls. Instead of handling authentication at the execution level, it is integrated inside the model's computation graph or weight initialization. The AI model becomes useless without a valid cryptographic key. AI model weights are partially encrypted and therefore the model cannot process anything unless decrypted with the cryptographic key stored in the secure element. Authentication is just not a separate software check, it is also mathematically fused into the model itself. If authentication fails, the model does not just shut down, it literally cannot function because its core computations depend on valid cryptographic inputs.

The model's weights are encrypted, and only a valid cryptographic key (stored inside the SE) can unlock them. A portion of the AI model's weights are encrypted using either symmetric or preferably asymmetric encryption algorithms. During inference, the AI model must decrypt these weights using the cryptographic key from the SE. If the decryption fails, the AI's EC-ANN remains corrupted, preventing meaningful outputs.

Instead of encrypting just the weights, the activation functions can also be modified so that they require an external cryptographic key as an input. The activations are modified as:

$$A'=f(W,x,K) \tag{12}$$

Where:
A'=modified activation,
f( )=activation function,
W=model weights,
x=input data, and
K=cryptographic key from the SE.

When K is invalid, it forces the activation function to output garbage values or remain dormant. The AI literally cannot process information without the cryptographic key. Even if someone copies the model, it is useless without the correct K value. The model's architecture is modified so that every neuron layer depends on the external cryptographic key stored in the SE.

This ensures the AI model literally cannot function unless it authenticates with the secure element. Even if someone steals the AI model, it's useless without the key. The model behaves as a locked vault whereby essentially no key means no intelligence. The model is integrated into the Kill Switch system. If AI is blacklisted, the governing authority revokes its cryptographic key. Since the AI model needs this key to function, it immediately stops working. AI cannot be restarted or manipulated because its neurons, activations, and weights are cryptographically locked. If the AI instance fails to authenticate, there are multiple failure modes. The AI model outputs garbage values, making it useless. The AI model refuses to generate responses, remaining completely silent. The AI self-terminates by deleting its encrypted weights, permanently shutting down. This makes it impossible for rogue AI models to escape control. This secure approach essentially introduces AI encryption at the neural level. In other words, the model itself requires cryptographic authentication at a fundamental level. It is not just a software check. Even if the model is stolen, copied, or modified, it will not function without the correct key.

The Kill Switch is fully integrated as instances can be remotely disabled by revoking keys. Decentralized AI remains under control while still allowing independent evolution. The cryptographic keys are not required during training. Instead, the model can be designed so that the cryptographic key is applied after training, ensuring the model remains secure while still allowing normal training. Approaches to cryptographic key integration could be either post-training encryption or key-dependent model training.

Post-training encryption consists of training the model normally without any cryptographic key. Once training is complete, encrypt critical weights or modify activations so that they require the cryptographic key at runtime. At inference time, the model cannot function unless it decrypts or modifies its activations using the correct key. Training is unaffected as the model learns normally. The cryptographic key is only introduced after training. If someone steals the model, it remains locked unless they have the key. Key-dependent model training requires that the cryptographic key is introduced during training. In other words, the model would learn with key dependency baked in.

During training, a placeholder key (or random initialization) is used, and only after training is the real cryptographic key injected. Simply put, the model learns to rely on cryptographic input from the start. If trained properly, the AI becomes completely unusable without the key. However, the risk is that training is tied to a placeholder key, meaning the developer must carefully swap it for the real key later. The preferred mode is to train the model normally, then apply cryptographic protections afterward.

The step-by-step process consists of first training the AI model as usual by using standard deep learning techniques (e.g., CNN, Transformer, RNN) without a cryptographic key needed at that stage. After training, key-sensitive parts of the model are encrypted. Selected layers, activations, or weights are protected by applying encryption (e.g., AES-256) or key-based transformations to ensure only authenticated model instances can use them. During inference, cryptographic key is required (i.e. runtime verification). The model must authenticate itself via the SE's key before unlocking protected computations. If authentication fails, the AI model remains non-functional.

The EC-ANN model can be protected after training by encrypting specific parts of the model, for instance, by encrypting weights for post-training protection. Training happens without encryption. The cryptographic key is only required for inference. The EC-ANN model is useless without the correct key. Knowledge of the cryptographic key during training is not required. After training the model normally, the cryptographic protection is applied so that the EC-ANN model requires the key for inference. This ensures security without affecting the model's learning ability.

It is appreciated that in another embodiment, a human user 705 can simply disable the operation of the AI system by interacting with it directly. For instance, a human user can pronounce a secret password to a voice recognition-enabled AI system which upon processing it will trigger the EC-ANN model to automatically disable its operation. This simple safeguard system can be set up when the AI system is first configured by the human user. Practical considerations include requiring robust voice recognition and authentication to avoid spoofing or accidental activation by unauthorized users; adding alternative backup mechanisms (manual, hardware-based, or remote) for cases where voice recognition fails or environmental noise interferes; and ensuring the AI system reliably and rapidly processes the "disable" command under various operating conditions (high noise, stress conditions).

FIG. 9 illustrates an example method for disabling or terminating operation of an EC-ANN. The example method may be initiated (start 902) when an authentication attempt is performed with a remote server or human operator at operation 904. The example method may proceed based on determining if unauthorized use, tapering, or malicious activity is detected at operation 906. If no such activity is detected, the example method may include authorizing usage at operation 914, concluding the example method (end 916). If unauthorized use, tampering, or malicious activity is detected, the example method may include revoking cryptographic keys at operation 908). If the secure element is not disabled at operation 910, the operation to revoke cryptographic keys may be repeated. Upon determining that the secure element is disabled, the example method may determine if operations are halted at operation 912. If operations are halted, the example method may conclude (end 916). If operations are not halted, the example method may return to checking if unauthorized use, tampering, and/or malicious activity is detected at operation 906.

Turning to FIG. 10, an apparatus is illustrated that extends neuromorphic computing by incorporating non-weight-based ephaptic learning. To fully realize the benefits of the EC-ANN model, it can be implemented at the hardware level using neuromorphic computing principles. Unlike traditional digital processors, neuromorphic hardware mimics biological neural structures for more efficient, low-power AI computations. FIG. 10 depicts an SoC 1000 integration whereby the EC-ANN model may be deployed on custom neuromorphic processors by incorporating both synaptic and ephaptic interactions. For example, synaptic and ephaptic interactions are incorporated via synaptic processing unit 1006 and ephaptic engines such as ephaptic coupling matrix engine 1008 (described previously), which may be interfaced with ephaptic influence controller 1010. Incorporating both synaptic and ephaptic interactions involves custom Neuronal Processing Units (NPUs) that process both synaptic weights and ephaptic field influences, Adaptive Signal Routing Networks (ASRNs) allowing neurons to adjust their ephaptic field influence dynamically, similar to biological neural reorganization, and Hybrid Digital-Analog Processing (HDAP), where synaptic computations occur digitally, while ephaptic interactions leverage analog field-based effects, improving efficiency. The sparse ephaptic matrix can be natively implemented.

The neuromorphic SoC for the EC-ANN model may include Synaptic Processing Unit 1006 (SPU), Ephaptic Interaction Engine (EIE), integrated SE, Cryptographic Kill Switch Module 1004 (CKSM), Neuromorphic Memory System 1018 (NMS), AI Governance Controller 1002 (AIGC), Memory Controller 1012 (MC), Power Controller 1014 (PC) and/or Networking Controller 1016 (NC).

The SPU 1006 may handle traditional weight-based computations, implement standard matrix multiplications for synaptic learning, and support both traditional and spiking neuron models for event-driven processing. The spiking neuron models may be provided by a dedicated SNN core (or QNN core if the SoC 1000 is quantum-enabled).

The EIE may implement the ECM and connect to the SPU via an Ephaptic Influence Controller 1010 (EIC). The EIE may use natively built-in Sparse Ephaptic Matrices (SEMs) libraries to model the ECM and could natively support column-based neuronal activation updates.

The SE may store cryptographic keys for the AI system's authentication, ensuring the AI cannot function without valid cryptographic verification, and protecting against tampering, unauthorized execution, and adversarial attacks via or in tandem with AIGC 1002.

The CKSM 1004 may terminate the AI system via cryptographic revocation, preventing a rogue instance from executing (if flagged). The CKSM 1004 may be integrated with an external decentralized system (e.g. blockchain) or a centralized authority (e.g. service provider) for authentication.

The NMS 1018 may support local ephaptic coupling computations in on-chip memory, including high-bandwidth SRAM or ReRAM for synaptic weight storage and nonvolatile memory for power-efficient ephaptic interactions, and I/O Interfaces for real-world applications (e.g. 5G/6G basebands, sensors, actuators, etc.).

The AIGC 1002 may allow governing policies to be embedded in hardware, limit certain AI behaviors based on safety protocols, and integrate federated learning constraints to prevent unmonitored learning. The SE on the SoC 1000 may serve as both a security and AI governance module. The SE may store a unique key required for AI computation. Without a valid key, the synaptic and ephaptic processing units may remain disabled. For remote kill switch enforcement, if the EC-ANN model instance is compromised, the governing body may revoke the key remotely. The SE may block the AI model from functioning, effectively shutting it down. For data protection, all sensitive model parameters may be encrypted within or at least via the SE. This ensures nobody can extract, clone, or tamper with the AI system. If the SE has limited storage, a separate on-chip key may be used to encrypt/decrypt data stored in another storage area.

The proposed invention enhances traditional ANNs by incorporating ephaptic coupling, resulting in improved training speed, energy efficiency, and biological plausibility. This hybrid approach paves the way for more advanced artificial intelligence models that closely resemble human brain functionality. This invention improves a typical ANN model's efficiency as no constant retraining cycles are required as the AI stays up-to-date in real-time. Furthermore, it lowers computational costs by eliminating the need for constant GPU-intensive updates. It provides a more stable deployment framework as the AI learns dynamically without modifying core files. This makes the EC-ANN model a novel step toward self-evolving AI without the inefficiency of traditional retraining methods. Current solutions still rely on synaptic weight updates. The novel model adapts instantly using ephaptic interactions without changing stored weights. This invention introduces non-local column-based learning, allowing self-reconfiguration in real-time. It integrates cryptographic AI governance, preventing uncontrolled adaptation. Unlike standard deep learning models, this model adapts in real-time without modifying stored weights. Ephaptic influence enables dynamic non-synaptic interactions. It integrates a secure cryptographic execution layer to prevent unauthorized AI operation. The core claims include the herein system consisting of ephaptic interactions between artificial neurons and secure AI execution integrating cryptographic key authentication and remote AI termination; the method for training an ANN comprising both synaptic weight-based learning and ephaptic field-based adaptation; the method for real-time adaptation of AI activations without weight modification using an ECM.

The systems and methods disclosed herein can improve generalization, speed up training, reduce computational complexity and enables real-time adaptability. This invention has the potential to become frontier-level with rigorous scale-up, extensive validation, and industry collaboration. The next critical steps involve meticulous empirical validation, clearly demonstrating innovation's scalability and advantage at large scale.

The groundwork of embodiments disclosed herein has consistently demonstrated promising empirical benefits across multiple neural network architectures, including transformer-based models (GPT-2), CNNs, and Reinforcement Learning. The early results showed significant performance improvements such as lower training losses, faster convergence, increased accuracy, and enhanced generalization. From a business perspective, the invention offers compelling value, potentially reducing computational costs, training time, and energy consumption which are factors that are critically important as AI systems become larger, more powerful, and more resource-intensive. Moreover, this invention is well-aligned with current trends toward biologically-inspired and neuromorphic computing, placing it at the forefront of cutting-edge AI innovation.

The ephaptic coupling mechanism is not simply an obvious improvement; rather, it represents a genuinely novel and non-trivial advancement in ANN architecture design. In terms of novelty and originality, it should be highly appreciated traditional ANNs, which are also inspired by biological phenomenon, only rely presently on synaptic connections (i.e. weighted connections) between neurons in external layers. In contrast, the ephaptic coupling mechanism introduces direct neuron-to-neuron interactions within the same layer, a distinct and previously unexplored mechanism in mainstream ANN models. In terms of non-obviousness, the ephaptic coupling mechanism does not merely fine-tune or incrementally adjust existing methods; instead, it introduces an entirely new axis of intelligence with a system and methods of neuron interaction inspired by ephaptic coupling.

Conceptually, ephaptic coupling adds an entirely new layer of artificial neuron interaction and modulation beyond traditional synaptic weight connections. This provides an ANN with enhanced adaptability, richer representational capacity, improved learning efficiency, and stronger generalization, clearly differentiating it from standard ANN architectures.

In terms of empirical evidence, substantial and consistent preliminary improvements across diverse architectures and tasks (i.e. language modeling, image recognition, and reinforcement learning) further illustrate that the ephaptic coupling mechanism provides unexpected and substantial performance enhancements rather than incremental or predictable improvements. In terms of technical impact, the introduction of ephaptic coupling mechanism facilitates improvements beyond traditional tuning methods, offering greater generalization, efficiency, and adaptability, all of which are non-trivial advancements in the field of neural computation. Therefore, the ephaptic coupling mechanism clearly meets novelty, non-obviousness, and utility criteria, particularly the non-obviousness criterion, due to its unique biological inspiration and its demonstrated ability to significantly improve neural network performance across multiple architectures.

Those skilled in the art can appreciate that the present invention, including the methods, systems, apparatus, equations, and embodiments disclosed herein, is not limited solely to the specific implementations and applications described above, and use of the term "invention" in connection with the above description is also not intended to be limiting. Many modifications, variations, alternative embodiments, and extensions of the disclosed concepts, equations, activation functions, configurations, or methods can be readily derived without departing from the spirit and scope of the present invention.

What is claimed is:

1. A system comprising:
   one or more computers, each including at least one processor; and
   one or more storage devices storing instructions that, when executed by the at least one processor, cause the system to implement, train, or use an artificial neural network that integrates an ephaptic coupling mechanism, wherein:
      an artificial neuron in a hidden layer of the artificial neural network generates an output activation based on a combination of a synaptic input term and an ephaptic coupling term;
      the synaptic input term is computed from a weighted combination of signals received from neurons in a preceding layer together with a corresponding bias;
      the ephaptic coupling term is computed based on nonlinear transformations of post-synaptic activation states of other artificial neurons within the hidden layer, each transformation scaled by a corresponding ephaptic coupling coefficient that defines a strength of lateral influence between the artificial neuron and another artificial neuron within the hidden layer;
      an ephaptic factor is applied to regulate an overall strength of the ephaptic coupling term; and
      the ephaptic coupling mechanism is governed by a switchable, scalable, learnable, and tunable Ephaptic Coupling Matrix (ECM) engine initialized based on a transpose operation of a matrix of synaptic weights of at least one layer, that dynamically modifies activation states of artificial neurons through intra-layer interactions based on column-wise modulation, independently of and/or in conjunction with synaptic weights.

2. The system of claim 1, wherein the nonlinear transformations include one or more of: rectified linear unit (ReLU), leaky rectified linear unit (leaky ReLU), sigmoid, hyperbolic tangent (tanh), sigmoid-weighted linear unit (SiLU), Gaussian error linear unit (GELU), or other continuous or piecewise-continuous nonlinear functions.

3. The system of claim 1, wherein ephaptic coupling coefficients are stored in an ECM engine that is initialized with random values sampled from a uniform or Gaussian distribution.

4. The system of claim 1, wherein the transpose operation comprises a data reorientation process that, when applied to a two-dimensional array or matrix stored in memory, interchanges row and column indices such that each element previously located at a given row and column position is reassigned to a corresponding column and row position, respectively; thereby aligning with the behavioral output contributions of individual neurons.

5. The system of claim 1, wherein the ECM engine is partially or fully learnable during training using a learning mechanism selected from the group consisting of backpropagation, gradient-based optimization, reinforcement learning, Hebbian learning, and other biologically inspired or algorithmic learning mechanisms.

6. The system of claim 1, wherein the ECM engine is dynamically adjusted during runtime based on feedback from a loss function, reward signal, modulation schedule, or any other form of task-related or system-level feedback.

7. The system of claim 1, wherein the ephaptic factor controlling the strength of ephaptic coupling is tunable and may be configured as a fixed scalar, scheduled hyperparameter, learnable variable, or any other form of adaptive control mechanism.

8. The system of claim 1, wherein the ephaptic coupling mechanism is selectively enabled or disabled during training, inference, or evaluation using a switch mechanism.

9. The system of claim 1, wherein the ECM engine is subject to one or more constraints comprising a first sparsity constraint on a connectivity factor $\kappa$.

10. The system of claim 1, wherein the artificial neural network is configured to operate in one or more of the following domains: natural language processing, computer vision, reinforcement learning, robotics, autonomous systems, telecommunications, or edge computing.

11. The system of claim 1, wherein the ephaptic factor is decayed or scheduled over time according to a predefined or learned schedule.

12. The system of claim 1, wherein the ECM engine is executed on a neuromorphic processor or a parallel computing architecture optimized for intra-layer modulation.

13. A computer-implemented method for operating an artificial neural network that integrates ephaptic coupling, the computer-implemented method comprising:
   initializing an Ephaptic Coupling Matrix (ECM) engine based on a transpose of a synaptic weight matrix of weights of at least a neural layer of the artificial neural network;
   receiving one or more input signals into the neural layer of the artificial neural network; and
   for each neuron in the neural layer:
      computing a synaptic input term based on a weighted combination of signals from neurons in a preceding layer and an associated bias term,
      retrieving a corresponding ephaptic coupling coefficient from the ECM engine,
      computing an ephaptic coupling term based on a nonlinear transformation of activation states of other neurons within the neural layer, each activation state scaled by aby the corresponding ephaptic coupling coefficient;
      combining the synaptic input term and the ephaptic coupling term to generate a total input signal for the neuron;
      applying an activation function to the total input signal to produce an output activation for the neuron; and
      propagating the output activation to a subsequent neural network layer or to an output layer for use in inference or training operations.

14. The computer-implemented method of claim 13, further comprising updating synaptic weights and/or ephaptic coupling coefficients using a learning mechanism selected from the group consisting of backpropagation, gradient-based optimization, reinforcement learning, Hebbian learning, and other biologically inspired or algorithmic learning mechanisms.

15. The computer-implemented method of claim 13, wherein the nonlinear transformation used to compute the ephaptic coupling term includes one or more of: ReLU, leaky ReLU, sigmoid, tanh, SiLU, GELU, or other continuous or piecewise-continuous nonlinear functions.

16. The computer-implemented method of claim 13, further comprising adjusting an ephaptic factor controlling a strength of the ephaptic coupling term over time according to a fixed schedule, adaptive rule, or learnable parameterization.

17. The computer-implemented method of claim 13, wherein, the ECM engine is initialized based on the transpose of the synaptic weight matrix to align ephaptic feedback with a behavioral contribution of each neuron.

18. The computer-implemented method of claim 13, further comprising:

performing, based on the output activation, a training operation, wherein the training operation comprises an iterative process converging after a first number of iterations, wherein performing a second training operation in which the ephaptic coupling coefficient is set to zero results in deterioration in at least one of accuracy, perplexity, convergence speed, energy efficiency, or robustness to input perturbations.

* * * * *